United States Patent
Sasaki et al.

(10) Patent No.: US 8,218,264 B1
(45) Date of Patent: Jul. 10, 2012

(54) MAGNETIC HEAD FOR PERPENDICULAR MAGNETIC RECORDING HAVING A MAIN POLE AND TWO SHIELDS

(75) Inventors: Yoshitaka Sasaki, Santa Clara, CA (US); Hiroyuki Ito, Milpitas, CA (US); Kazuki Sato, Milpitas, CA (US); Atsushi Iijima, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 58 days.

(21) Appl. No.: 12/982,349

(22) Filed: Dec. 30, 2010

(51) Int. Cl.
*G11B 5/127* (2006.01)
(52) U.S. Cl. .................................. 360/125.16
(58) Field of Classification Search .............. 360/125.16
See application file for complete search history.

(56) References Cited

U.S. PATENT DOCUMENTS

| | | | |
|---|---|---|---|
| 6,954,340 B2 | 10/2005 | Shukh et al. | |
| 7,382,575 B2 * | 6/2008 | Amin et al. | 360/125.16 |
| 7,486,477 B2 * | 2/2009 | Yazawa et al. | 360/125.03 |
| 7,542,233 B2 * | 6/2009 | Hirata et al. | 360/123.12 |
| 7,821,745 B2 * | 10/2010 | Kameda et al. | 360/317 |
| 2004/0150911 A1 | 8/2004 | Sasaki et al. | |
| 2005/0128637 A1 | 6/2005 | Johnston et al. | |
| 2008/0088971 A1 | 4/2008 | Sasaki et al. | |

OTHER PUBLICATIONS

U.S. Appl. No. 13/014,322, filed Jan. 26, 2011 in the name of Sasaki et al.

* cited by examiner

*Primary Examiner* — Mark Blouin
(74) *Attorney, Agent, or Firm* — Oliff & Berridge, PLC

(57) ABSTRACT

A magnetic head includes: a coil; a main pole; a first shield disposed backward of the main pole along a direction of travel of a recording medium; a first return path section connecting the first shield to the main pole; a second shield disposed forward of the main pole along the direction of travel of the recording medium; and a second return path section connecting the second shield to the main pole. An interface between the first return path section and the main pole has an end closest to a medium facing surface, and an interface between the second return path section and the main pole has an end closest to the medium facing surface, the latter being closer to the medium facing surface than the former. The second return path section includes a yoke layer located away from the medium facing surface and in contact with the main pole. The coil includes at least one coil element that passes between the second shield and the yoke layer.

6 Claims, 21 Drawing Sheets

MAGNETIC HEAD FOR PERPENDICULAR MAGNETIC RECORDING HAVING A MAIN POLE AND TWO SHIELDS

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and two shields.

2. Description of Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head having a magnetoresistive element (hereinafter, also referred to as MR element) for reading and a write head having an induction-type electromagnetic transducer for writing are stacked on a substrate. The write head includes a main pole that produces a magnetic field in a direction perpendicular to the plane of the recording medium. The main pole includes, for example, a track width defining portion having an end located in a medium facing surface that faces the recording medium, and a wide portion that is connected to the other end of the track width defining portion and is greater in width than the track width defining portion. The track width defining portion has a generally constant width. To achieve higher recording density, it is required that the write heads of the perpendicular magnetic recording system be smaller in track width and improved in write characteristics such as an overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of the recording medium by means of an airflow that comes from the air inflow end into the space between the medium facing surface and the recording medium. The magnetic head is typically disposed near the air outflow end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erase). To increase the recording density, it is required to prevent the occurrence of adjacent track erase.

Providing one or more shields near the main pole is effective for preventing the aforementioned skew-induced adjacent track erase and increasing the recording density. For example, U.S. Pat. No. 6,954,340 B2 and U.S. Patent Application Publication No. 2005/0128637 A1 describe a magnetic head including four shields: one having an end face located in the medium facing surface at a position forward of an end face of the main pole along the direction of travel of the recording medium; another having an end face located in the medium facing surface at a position backward of the end face of the main pole along the direction of travel of the recording medium; and the other two having two end faces located in the medium facing surface at positions on opposite sides of the end face of the main pole in the track width direction. The end faces of the four shields are arranged to wrap around the end face of the main pole in the medium facing surface.

In a magnetic head, a position forward of the main pole along the direction of travel of the recording medium is a position on the air-outflow-end side (the trailing end side), while a position backward of the main pole along the direction of travel of the recording medium is a position on the air-inflow-end side (the leading end side). Hereinafter, a shield having an end face located forward of the end face of the main pole along the direction of travel of the recording medium will be referred to as a trailing shield, while a shield having an end face located backward of the end face of the main pole along the direction of travel of the recording medium will be referred to as a leading shield.

In a magnetic head having one or more shields, there is typically provided a magnetic layer for connecting the one or more shields to a part of the main pole away from the medium facing surface. The one or more shields and the aforementioned magnetic layer function to capture a magnetic flux that is produced from the end face of the main pole and that expands in directions other than the direction perpendicular to the plane of the recording medium, and to thereby prevent the magnetic flux from reaching the recording medium. The one or more shields and the aforementioned magnetic layer also function to allow a magnetic flux that has been produced from the end face of the main pole and has magnetized the recording medium to flow back to the main pole. Thus, the magnetic head having one or more shields allows prevention of the adjacent track erase and allows a further improvement in recording density.

The position of an end of a record bit to be recorded on the recording medium depends on the position of an end of the end face of the main pole located in the medium facing surface, the end being located forward along the direction of travel of the recording medium. For this reason, in the magnetic head having the leading shield and the trailing shield, it is important especially for the trailing shield to be capable of capturing as much magnetic flux as possible in order to accurately define the position of the end of the record bit.

In addition, as the frequency of the recording signal is increased in order to increase the recording density, the magnetic head is required to be improved in the rate of change in the direction of the magnetic flux produced from the end face of the main pole. To satisfy this requirement, it is particularly effective for the magnetic head having the leading shield and the trailing shield to shorten the length of a magnetic path that passes through the main pole and the trailing shield which captures much magnetic flux.

However, no attempts have been made to reduce the length of the magnetic path that passes through the main pole and the trailing shield.

OBJECT AND SUMMARY OF THE INVENTION

It is an object of the present invention to provide a magnetic head for perpendicular magnetic recording that is capable of reducing the length of a magnetic path that passes through a main pole and a shield, the shield having an end face located in the medium facing surface at a position forward of an end face of the main pole along the direction of travel of the recording medium.

A magnetic head for perpendicular magnetic recording of the present invention includes: a medium facing surface that faces a recording medium; a coil that produces a magnetic field corresponding to data to be written on the recording medium; and a main pole that has an end face located in the medium facing surface, allows a magnetic flux corresponding to the magnetic field produced by the coil to pass, and produces a write magnetic field for writing the data on the recording medium by means of a perpendicular magnetic recording system. The magnetic head further includes: a first shield made of a magnetic material and having an end face that is located in the medium facing surface at a position backward of the end face of the main pole along a direction of travel of the recording medium; a second shield made of a magnetic material and having an end face that is located in the medium facing surface at a position forward of the end face of the main pole along the direction of travel of the recording medium; and a gap part made of a nonmagnetic material and provided between the main pole and each of the first and second shields. The magnetic head further includes: a first return path section that is made of a magnetic material, disposed backward of the main pole along the direction of travel of the recording medium, and in contact with the first shield and the main pole; and a second return path section that is made of a magnetic material, disposed forward of the main pole along the direction of travel of the recording medium, and in contact with the second shield and the main pole.

The first return path section has an end face that is located away from the medium facing surface and in contact with the main pole. The first return path section connects the first shield and the main pole to each other so that a first space is defined by the main pole, the gap part, the first shield, and the first return path section. The second return path section has an end face that is located away from the medium facing surface and in contact with the main pole. The second return path section connects the second shield and the main pole to each other so that a second space is defined by the main pole, the gap part, the second shield, and the second return path section. A first interface is formed between the main pole and the end face of the first return path section, while a second interface is formed between the main pole and the end face of the second return path section. The first interface has a first end that is closest to the medium facing surface. The second interface has a second end that is closest to the medium facing surface. The second end is located closer to the medium facing surface than is the first end.

The second return path section includes: a yoke layer that is located away from the medium facing surface and includes the end face of the second return path section; and a connection part that is located forward of the second shield and the yoke layer along the direction of travel of the recording medium and connects the second shield and the yoke layer to each other. The coil includes one or more first coil elements that extend to pass through the first space, and one or more second coil elements that extend to pass through the second space. The one or more second coil elements include at least one first specific coil element that passes between the second shield and the yoke layer.

In the magnetic head for perpendicular magnetic recording of the present invention, the one or more first coil elements may be two or more first coil elements, while the one or more second coil elements may be two or more second coil elements. In this case, the two or more first coil elements may be aligned in a direction perpendicular to the medium facing surface, and the at least one first specific coil element may be smaller in number than the two or more first coil elements. The two or more second coil elements may include at least one second specific coil element that is located forward of the at least one first specific coil element along the direction of travel of the recording medium.

In the magnetic head for perpendicular magnetic recording of the present invention, the coil may include a first portion and a second portion, the first portion including the one or more first coil elements and being wound around part of the first return path section, the second portion including the one or more second coil elements and being wound around part of the second return path section.

In the magnetic head for perpendicular magnetic recording of the present invention, the coil may be wound around the main pole.

The magnetic head for perpendicular magnetic recording of the present invention may further include two side shields that are each made of a magnetic material and that have two end faces located in the medium facing surface at positions on opposite sides of the end face of the main pole in the track width direction.

In the magnetic head for perpendicular magnetic recording of the present invention, the second end of the second interface between the main pole and the end face of the second return path section is located closer to the medium facing surface than is the first end of the first interface between the main pole and the first return path section. The one or more second coil elements extending to pass through the second space include at least one first specific coil element that passes between the second shield and the yoke layer. Consequently, according to the present invention, it is possible to reduce the length of the magnetic path that passes through the second shield and the main pole, the second shield having an end face that is located in the medium facing surface at a position forward of the end face of the main pole along the direction of travel of the recording medium. In other words, it is possible to reduce the length of the magnetic path that passes through the second shield, the second return path section, and the main pole. This allows improving the rate of change in the direction of the magnetic flux produced from the end face of the main pole.

Other objects, features and advantages of the present invention will become fully apparent from the following description.

DETAILED DESCRIPTION OF THE PREFERRED EMBODIMENTS

First Embodiment

Figure 1:
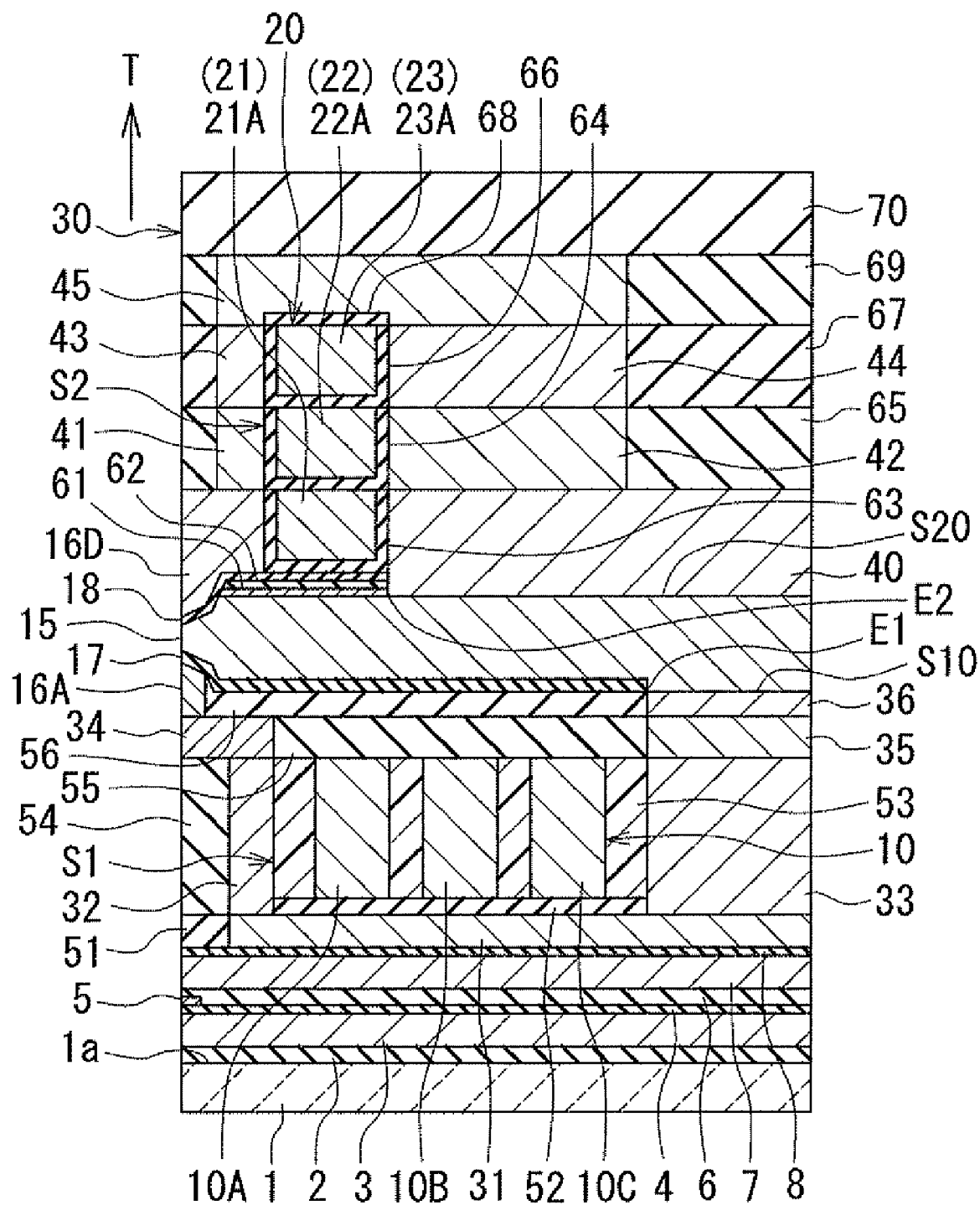
FIG. 1 is a cross-sectional view of a magnetic head according to a first embodiment of the invention.
Figure 2:
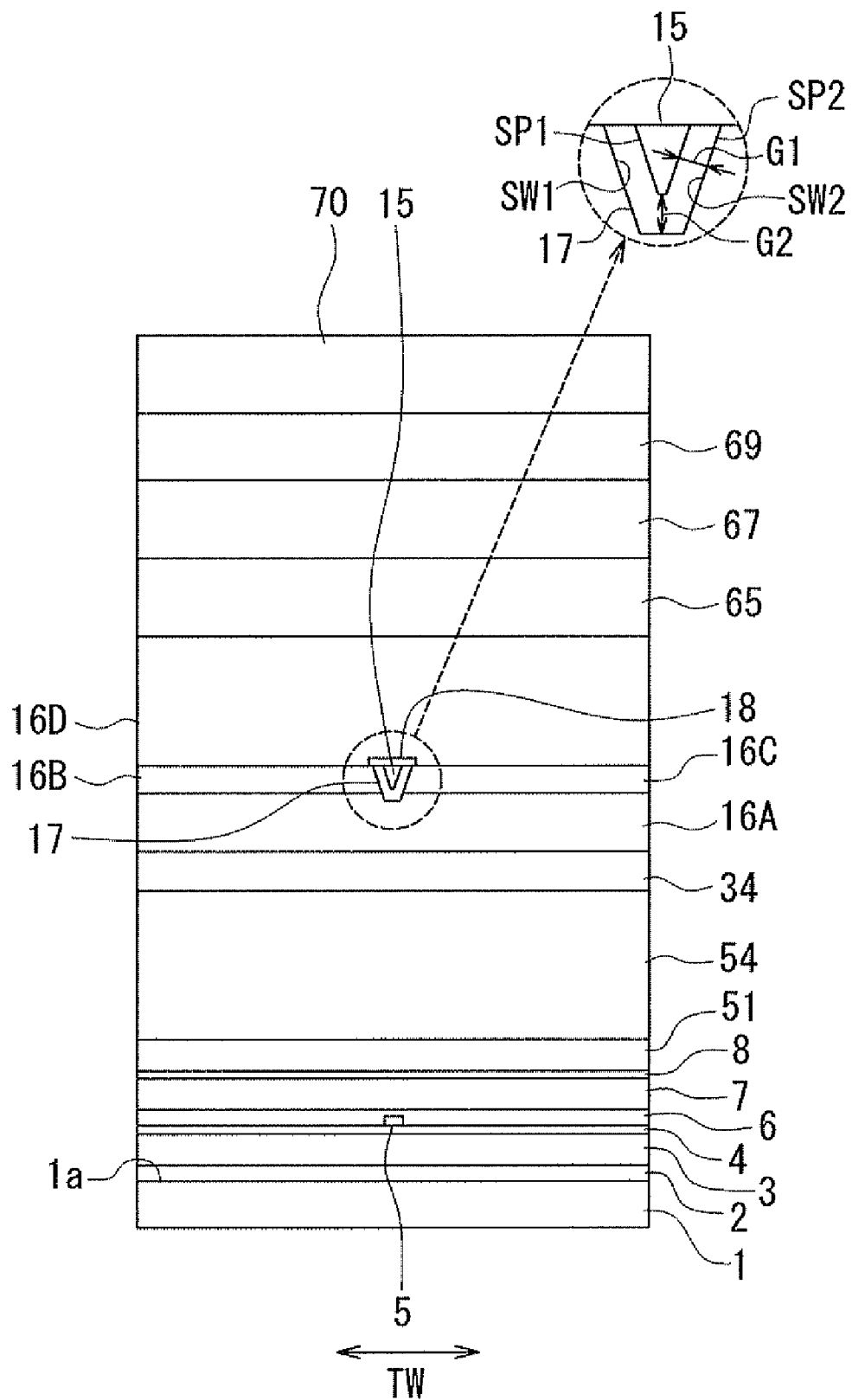
FIG. 2 is a front view showing the medium facing surface of the magnetic head according to the first embodiment of the invention.
Figure 3:
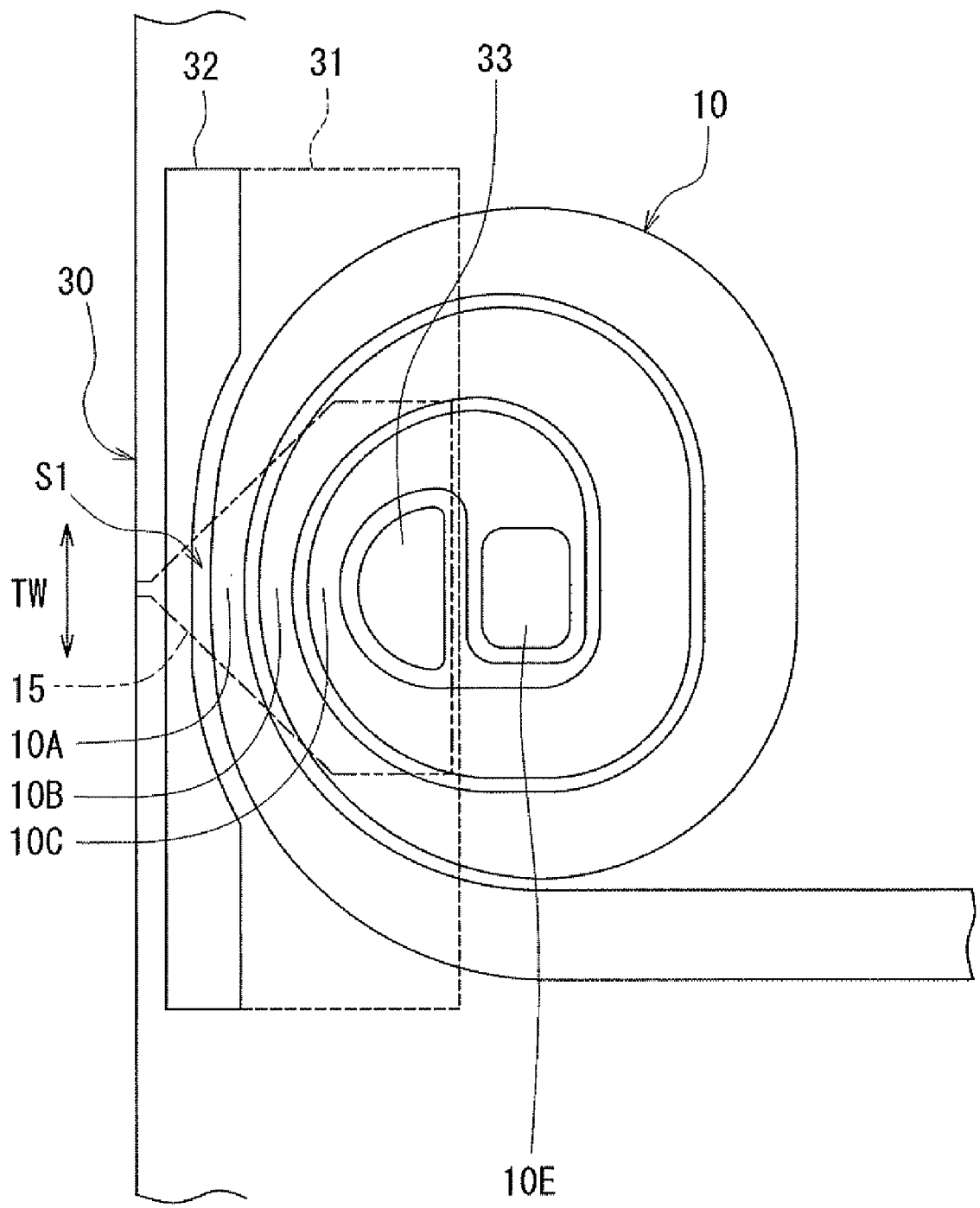
FIG. 3 is a plan view showing a first portion of a coil in the magnetic head according to the first embodiment of the invention.
Figure 4:
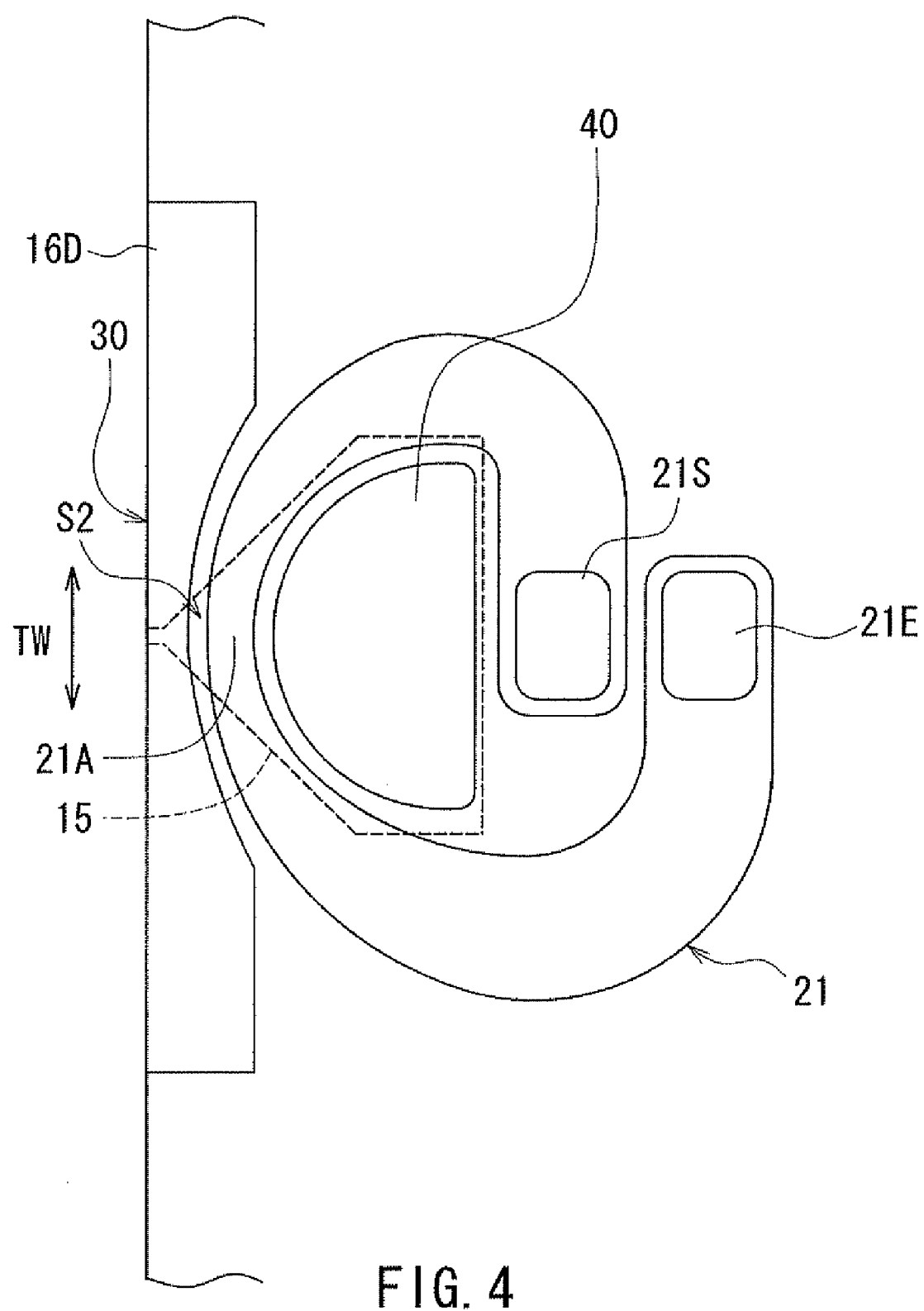
FIG. 4 is a plan view showing a first layer of a second portion of the coil in the magnetic head according to the first embodiment of the invention.
Figure 5:
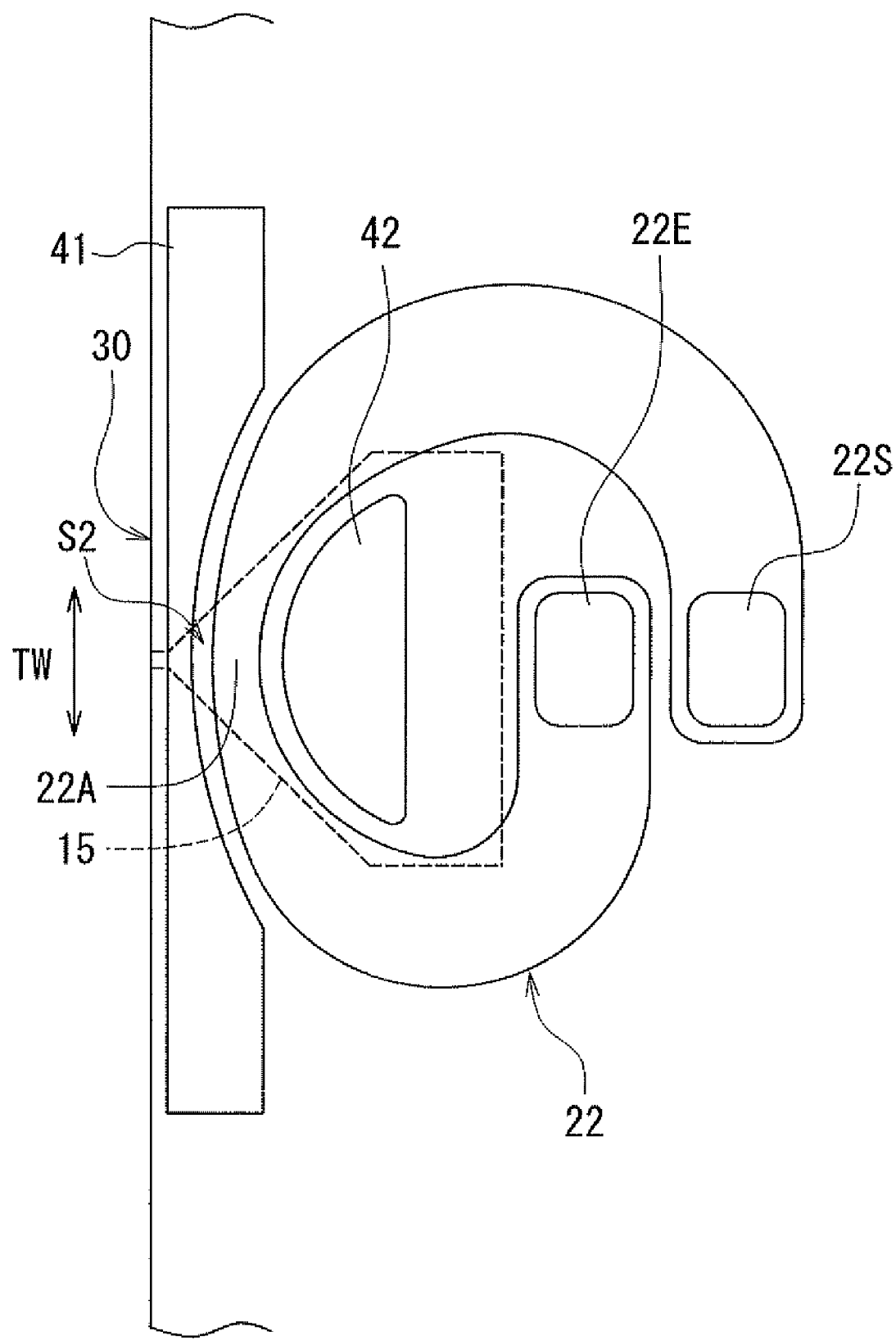
FIG. 5 is a plan view showing a second layer of the second portion of the coil in the magnetic head according to the first embodiment of the invention.
Figure 6:
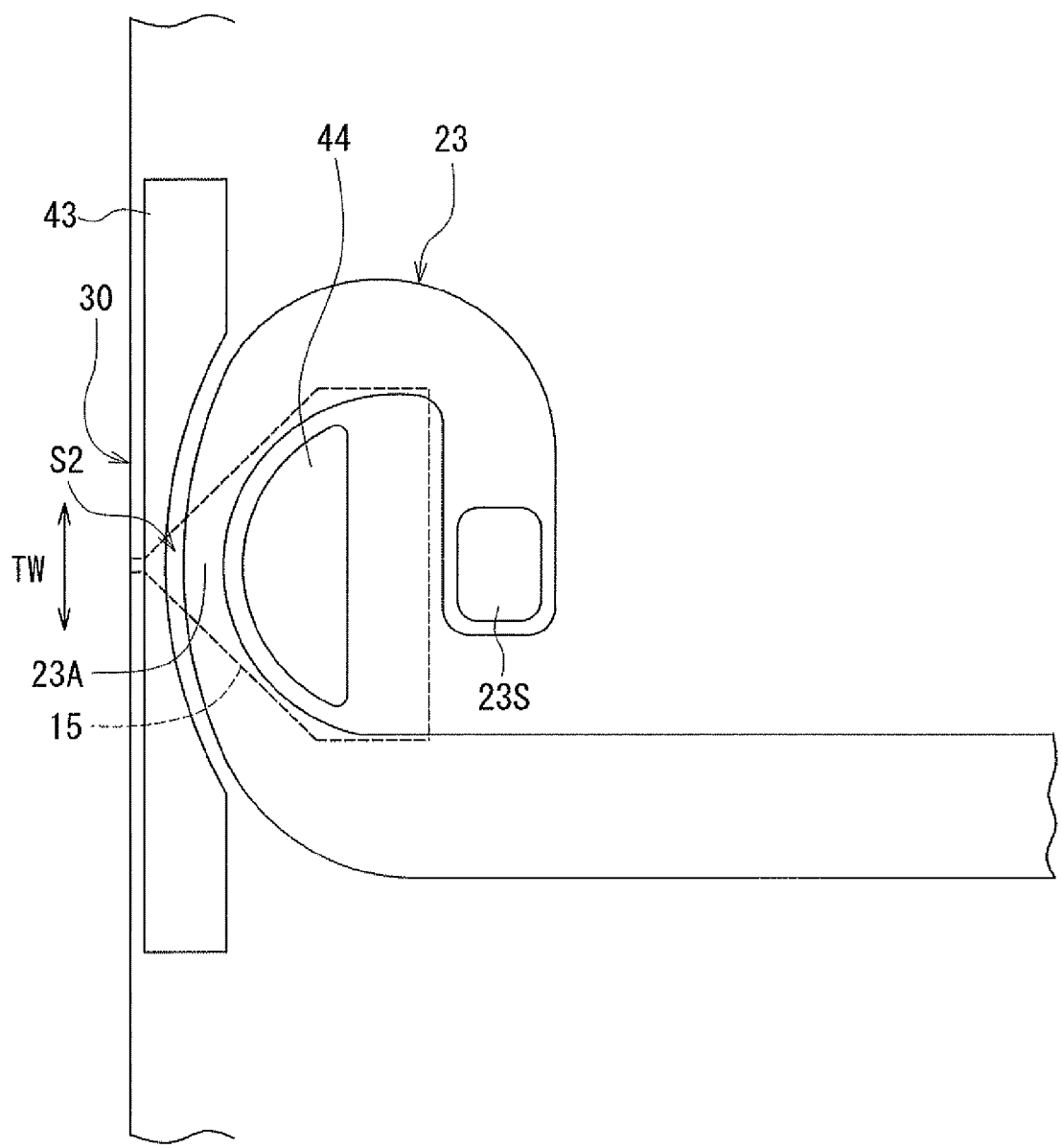
FIG. 6 is a plan view showing a third layer of the second portion of the coil in the magnetic head according to the first embodiment of the invention.

Embodiments of the present invention will now be described in detail with reference to the drawings. First, reference is made to FIG. 1 to FIG. 6 to describe the configuration of a magnetic head according to a first embodiment of the invention. FIG. 1 is a cross-sectional view of the magnetic head according to the present embodiment. Note that FIG. 1 shows a cross section perpendicular to the medium facing surface and the top surface of the substrate. The arrow with the symbol T in FIG. 1 indicates the direction of travel of the recording medium. FIG. 2 is a front view showing the medium facing surface of the magnetic head according to the present embodiment. FIG. 3 is a plan view showing a first portion of a coil in the magnetic head according to the present embodiment. FIG. 4 is a plan view showing a first layer of a second portion of the coil in the magnetic head according to the present embodiment. FIG. 5 is a plan view showing a second layer of the second portion of the coil in the magnetic head according to the present embodiment. FIG. 6 is a plan view showing a third layer of the second portion of the coil in the magnetic head according to the present embodiment. The arrows with the symbol TW in FIG. 2 to FIG. 6 indicate the track width direction.

As shown in FIG. 1 and FIG. 2, the magnetic head for perpendicular magnetic recording (hereinafter simply referred to as magnetic head) according to the present embodiment includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a bottom read shield layer 3 made of a magnetic material and disposed on the insulating layer 2; a bottom read shield gap film 4 which is an insulating film disposed on the bottom read shield layer 3; a magnetoresistive (MR) element 5 as a read element disposed on the bottom read shield gap film 4; a top read shield gap film 6 which is an insulating film disposed on the MR element 5; and a top read shield layer 7 made of a magnetic material and disposed on the top read shield gap film 6.

An end of the MR element 5 is located in a medium facing surface 30 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the bottom read shield layer 3 to the top read shield layer 7 constitute a read head. The magnetic head further includes a nonmagnetic layer 8 made of a nonmagnetic material and disposed on the top read shield layer 7, and a write head disposed on the nonmagnetic layer 8. The nonmagnetic layer 8 is made of alumina, for example. The write head includes a coil, a main pole 15, a first shield 16A, two side shields 16B and 16C, a second shield 16D, and a gap part.

The coil produces a magnetic field corresponding to data to be written on the recording medium. The coil includes a first portion 10 and a second portion 20. The first portion 10 and the second portion 20 are both made of a conductive material such as copper. The first portion 10 and the second portion 20 are connected in series or in parallel. The main pole 15 has an end face located in the medium facing surface 30. The main pole 15 allows a magnetic flux corresponding to the magnetic field produced by the coil to pass, and produces a write magnetic field for writing data on the recording medium by means of the perpendicular magnetic recording system. FIG. 1 shows a cross section that intersects the end face of the main pole 15 located in the medium facing surface 30 and that is perpendicular to the medium facing surface 30 and the top surface 1a of the substrate 1 (the cross section will hereinafter be referred to as main cross section). The coil will be described in more detail later.

Each of the shields 16A, 16B, 16C, and 16D is made of a magnetic material. Examples of materials that can be used for the shields 16A, 16B, 16C, and 16D include CoFeN, CoNiFe, NiFe, and CoFe.

The two side shields 16B and 16C are located on opposite sides of the main pole 15 in the track width direction TW. Relative to the main pole 15, the first shield 16A is located backward along the direction T of travel of the recording medium (i.e., on the leading end side). Relative to the main pole 15, the second shield 16D is located forward along the direction T of travel of the recording medium (i.e., on the trailing end side). The side shields 16B and 16C magnetically couple the first shield 16A and the second shield 16D to each other.

The first shield 16A has an end face that is located in the medium facing surface 30 at a position backward of the end face of the main pole 15 along the direction T of travel of the recording medium. The second shield 16D has an end face that is located in the medium facing surface 30 at a position forward of the end face of the main pole 15 along the direction T of travel of the recording medium. The two side shields 16B and 16C have two end faces located on opposite sides of the main pole 15 in the track width direction TW. In the medium facing surface 30, the end faces of the shields 16A, 16B, 16C and 16D are arranged to wrap around the end face of the main pole 15.

The magnetic head further includes a first return path section and a second return path section. Each of the first and second return path sections is made of a magnetic material. Examples of materials that can be used for the first and second return path sections include CoFeN, CoNiFe, NiFe, and CoFe. The first return path section is located backward of the main pole 15 along the direction of travel of the recording medium and is in contact with the first shield 16A and the main pole 15, thereby magnetically coupling the first shield 16A and the main pole 15 to each other. The second return path section is located forward of the main pole 15 along the direction of travel of the recording medium and is in contact with the second shield 16D and the main pole 15, thereby magnetically coupling the second shield 16D and the main pole 15 to each other.

The first return path section includes magnetic layers 31 to 36. The magnetic layer 31 is located on the nonmagnetic layer 8. The magnetic layers 32 and 33 are both located on the magnetic layer 31. The magnetic layer 32 is located near the medium facing surface 30. The magnetic layer 33 is located farther from the medium facing surface 30 than is the magnetic layer 32. The magnetic layers 31 and 32 have their respective end faces facing toward the medium facing surface 30. These end faces are located at a distance from the medium surface 30.

The magnetic head further includes an insulating layer 51 made of an insulating material and disposed around the magnetic layer 31 on the nonmagnetic layer 8, and an insulating layer 52 made of an insulating material and disposed on part of the top surface of the magnetic layer 31. The insulating layers 51 and 52 are made of alumina, for example. At least part of the first portion 10 is located on the insulating layer 52. The first portion 10 is planar spiral-shaped and is wound around the magnetic layer 33 which constitutes part of the first return path section.

The magnetic head further includes: an insulating layer 53 made of an insulating material and disposed around the first portion 10 and the magnetic layer 33 and in the space between every adjacent turns of the first portion 10; and an insulating layer 54 made of an insulating material and disposed around the insulating layer 53 and the magnetic layer 32. The top surfaces of the first portion 10, the magnetic layers 32 and 33 and the insulating layers 53 and 54 are even with each other. The insulating layer 53 is made of photoresist, for example. In the present embodiment, the insulating layer 54 is particularly made of an inorganic insulating material harder than the magnetic material that is used for the magnetic layer 32. Alumina is an example of such inorganic insulating materials.

The magnetic layer 34 is disposed on the magnetic layer 32 and the insulating layer 54. The magnetic layer 35 is disposed on the magnetic layer 33. The magnetic layer 34 has an end face located in the medium facing surface 30. The magnetic head further includes an insulating layer 55 made of an insulating material and disposed around the magnetic layers 34 and 35 on the top surfaces of the first portion 10 and the insulating layer 53. The insulating layer 55 is made of alumina, for example. The top surfaces of the magnetic layers 34 and 35 and the insulating layer 55 are even with each other.

The first shield 16A is disposed on the magnetic layer 34. The magnetic layer 36 is disposed on the magnetic layer 35. The magnetic head further includes an insulating layer 56 made of an insulating material and disposed around the first shield 16A and the magnetic layer 36 on a part of the top surface of the magnetic layer 34 and the top surface of the insulating layer 55. The insulating layer 56 is made of alumina, for example.

The main pole 15 has: a bottom end 15L which is an end closer to the top surface 1a of the substrate 1; a top surface 15T opposite to the bottom end 15L; and first and second side parts SP1 and SP2 that are opposite to each other in the track width direction TW. The side shield 16B has a first sidewall SW1 that is opposed to the first side part SP1 of the main pole 15. The side shield 16C has a second sidewall SW2 that is opposed to the second side part SP2 of the main pole 15.

The gap part is made of a nonmagnetic material and disposed between the main pole 15 and the shields 16A, 16B, 16C and 16D. The gap part includes a first gap layer 17 disposed between the main pole 15 and the first shield 16A and between the main pole 15 and the side shields 16B and 16C, and a second gap layer 18 disposed between the main pole 15 and the second shield 16D.

The side shields 16B and 16C are disposed on the first shield 16A and are in contact with the top surface of the first shield 16A. The first gap layer 17 is arranged to extend along the sidewalls of the side shields 16B and 16C, the top surface of the first shield 16A, and the top surface of the insulating layer 56. The first gap layer 17 is made of a nonmagnetic material. The nonmagnetic material used to form the first gap layer 17 may be an insulating material or a nonmagnetic metal material. Alumina is an example of insulating materials that can be used to form the first gap layer 17. Ru is an example of nonmagnetic metal materials that can be used to form the first gap layer 17. The first gap layer 17 has an opening for exposing the top surface of the magnetic layer 36.

The main pole 15 is disposed over the first shield 16A and the insulating layer 56 such that the first gap layer 17 is interposed between the main pole 15 and the top surfaces of the first shield 16A and the insulating layer 56. As shown in FIG. 2, the first gap layer 17 is interposed also between the main pole 15 and the side shields 16B and 16C.

The bottom end 15L of the main pole 15 is in contact with the top surface of the magnetic layer 36 at a position away from the medium facing surface 30. The main pole 15 is made of a magnetic metal material. Examples of materials that can be used for the main pole 15 include NiFe, CoNiFe, and CoFe. The shape of the main pole 15 will be described in detail later.

The magnetic head further includes a not-shown nonmagnetic layer made of a nonmagnetic material and disposed around the main pole 15, the first shield 16A and the side shields 16B and 16C. In the present embodiment, the not-shown nonmagnetic layer is made of a nonmagnetic insulating material such as alumina, in particular.

The magnetic head further includes: a nonmagnetic metal layer 61 made of a nonmagnetic metal material and disposed on part of the top surface 15T of the main pole 15 at a position away from the medium facing surface; and an insulating layer 62 made of an insulating material and disposed on the top surface of the nonmagnetic metal layer 61. The nonmagnetic metal layer 61 is made of Ru, NiCr, or NiCu, for example. The insulating layer 62 is made of alumina, for example.

The second gap layer 18 is disposed to cover the main pole 15, the nonmagnetic metal layer 61, and the insulating layer 62. The second gap layer 18 is made of a nonmagnetic material. Examples of materials that can be used for the second gap layer 18 include nonmagnetic insulating materials such as alumina, and nonmagnetic conductive materials such as Ru, NiCu, Ta, W, NiB, and NiP.

The second shield 16D is disposed over the side shields 16B and 16C and the second gap layer 18, and is in contact with the top surfaces of the side shields 16B and 16C and the second gap layer 18. In the medium facing surface 30, part of the end face of the second shield 16D is located at a predetermined distance from the end face of the main pole 15, the distance being created by the thickness of the second gap layer 18. The thickness of the second gap layer 18 preferably falls within the range of 5 to 60 nm, and may be 30 to 60 nm, for example. The end face of the main pole 15 has a side that is adjacent to the second gap layer 18, and the side defines the track width.

The second return path section includes a yoke layer 40 and magnetic layers 41 to 45. The yoke layer 40 is disposed on the main pole 15 at a position away from the medium facing surface 30. The magnetic layers 41 to 45 connect the second shield 16D and the yoke layer 40 to each other.

The second portion 20 of the coil includes a first layer 21, a second layer 22, and a third layer 23. Part of the first layer 21 passes between the second shield 16D and the yoke layer 40. The magnetic head further includes: an insulating film 63 made of an insulating material and interposed between the first layer 21 and each of the second shield 16D, the yoke layer 40 and the second gap layer 18; and a not-shown insulating layer made of an insulating material and disposed around the first layer 21, the second shield 16D and the yoke layer 40. The insulating film 63 and the not-shown insulating layer are made of alumina, for example. The top surfaces of the first layer 21, the second shield 16D, the yoke layer 40, the insulating film 63 and the not-shown insulating layer are even with each other.

The magnetic layer 41 is disposed on the second shield 16D. The magnetic layer 41 has an end face that faces toward the medium facing surface 30. This end face is located at a distance from the medium facing surface 30. The magnetic layer 42 is disposed on the yoke layer 40.

The second layer 22 is disposed above the first layer 21. Part of the second layer 22 passes between the magnetic layer 41 and the magnetic layer 42. The magnetic head further includes: an insulating film 64 made of an insulating material and interposed between the second layer 22 and each of the first layer 21 and the magnetic layers 41 and 42: and an insulating layer 65 made of an insulating material and disposed around the second layer 22 and the magnetic layers 41 and 42. The insulating film 64 and the insulating layer 65 are made of alumina, for example. The top surfaces of the second layer 22, the magnetic layers 41 and 42, the insulating film 64 and the insulating layer 65 are even with each other.

The magnetic layer 43 is disposed on the magnetic layer 41. The magnetic layer 43 has an end face that faces toward the medium facing surface 30. This end face is located at a distance from the medium facing surface 30. The magnetic layer 44 is disposed on the magnetic layer 42.

The third layer 23 is disposed above the second layer 22. Part of the third layer 23 passes between the magnetic layer 43 and the magnetic layer 44. The magnetic head further includes: an insulating film 66 made of an insulating material and interposed between the third layer 23 and each of the second layer 22 and the magnetic layers 43 and 44: and an insulating layer 67 made of an insulating material and disposed around the third layer 23 and the magnetic layers 43 and 44. The insulating film 66 and the insulating layer 67 are made of alumina, for example. The top surfaces of the third layer 23, the magnetic layers 43 and 44, the insulating film 66 and the insulating layer 67 are even with each other. The magnetic head further includes an insulating film 68 made of an insulating material and disposed to cover the third layer 23. The insulating film 68 is made of alumina, for example.

The magnetic layer 45 is disposed over the magnetic layers 43 and 44 and the insulating film 68, and connects the magnetic layer 43 and the magnetic layer 44 to each other. The magnetic layer 45 has an end face that faces toward the medium facing surface 30. This end face is located at a distance from the medium facing surface 30. The magnetic head further includes an insulating layer 69 made of an insulating material and disposed around the magnetic layer 45. The insulating layer 69 is made of alumina, for example. The top surfaces of the magnetic layer 45 and the insulating layer 69 are even with each other.

The magnetic head further includes a protection layer 70 made of a nonmagnetic material and disposed to cover the magnetic layer 45. The protection layer 70 is made of, for example, an inorganic insulating material such as alumina.

As has been described, the magnetic head according to the present embodiment includes the medium facing surface 30, the read head, and the write head. The medium facing surface 30 faces the recording medium. The read head and the write head are stacked on the substrate 1. Relative to the write head, the read head is disposed backward along the direction T of travel of the recording medium (i.e., on the leading end side).

The read head includes: the MR element 5 as the read element; the bottom read shield layer 3 and the top read shield layer 7 for shielding the MR element 5, with their respective portions near the medium facing surface 30 opposed to each other with the MR element 5 therebetween; the bottom read shield gap film 4 disposed between the MR element 5 and the bottom read shield layer 3; and the top read shield gap film 6 disposed between the MR element 5 and the top read shield layer 7.

The write head includes: the coil including the first and second portions 10 and 20; the main pole 15; the first shield 16A; the two side shields 16B and 16C; the second shield 16D; the gap part; and the first and second return path sections.

The two side shields 16B and 16C are disposed near the medium facing surface 30 at positions on opposite sides of the main pole 15 in the track width direction TW. The positions of the two side shields 16B and 16C are symmetric with respect to the center of the main pole 15 in the track width direction TW. The first shield 16A is disposed near the medium facing surface 30 at a position backward of the side shields 16B and 16C along the direction T of travel of the recording medium. The second shield 16D is disposed near the medium facing surface 30 at a position forward of the side shields 16B and 16C along the direction T of travel of the recording medium.

The first shield 16A has an end face that is located in the medium facing surface 30 at a position backward of the end face of the main pole 15 along the direction T of travel of the recording medium. The two side shields 16B and 16C have two end faces that are located in the medium facing surface 30 at positions on opposite sides of the end face of the main pole 15 in the track width direction TW. The second shield 16D has an end face that is located in the medium facing surface 30 at a position forward of the end face of the main pole 15 along the direction T of travel of the recording medium.

The gap part includes the first gap layer 17 disposed between the main pole 15 and the first shield 16A and between the main pole 15 and the side shields 16B and 16C, and the second gap layer 18 disposed between the main pole 15 and the second shield 16D.

The first return path section is made of a magnetic material and disposed backward of the main pole 15 along the direction T of travel of the recording medium. The first return path section is in contact with the first shield 16A and the main pole 15. The first return path section includes the magnetic layers 31 to 36.

The first return path section has an end face that is located away from the medium facing surface 30 and in contact with the main pole 15. This end face is the top surface of the magnetic layer 36. A first interface S10 is formed between the main pole 15 and the aforementioned end face of the first return path section (the top surface of the magnetic layer 36). As shown in FIG. 1, the first return path section connects the first shield 16A and the main pole 15 to each other so that a first space S1 is defined by the main pole 15, the gap part (the gap layer 17), the first shield 16A and the first return path section, thereby magnetically coupling the first shield 16A and the main pole 15 to each other.

In the first return path section, the magnetic layers 34 and 32 magnetically couple the first shield 16A and the magnetic layer 31 to each other. The magnetic layer 34 has an end face that is located in the medium facing surface 30 at a position backward of the end face of the first shield 16A along the direction T of travel of the recording medium. In the main cross section, the magnetic layer 31 is greater than the first shield 16A in length in the direction perpendicular to the medium facing surface 30. In the main cross section, each of the magnetic layers 34 and 32 is greater than the first shield 16A and smaller than the magnetic layer 31 in length in the direction perpendicular to the medium facing surface 30.

In the present embodiment, neither of the magnetic layers 31 and 32 is exposed in the medium facing surface 30. The magnetic layers 31 and 32 have their respective end faces facing toward the medium facing surface 30. These end faces are located at a distance from the medium facing surface 30. Part of the insulating layer 51 is interposed between the medium facing surface 30 and the aforementioned end face of the magnetic layer 31. Part of the insulating layer 54 is interposed between the medium facing surface 30 and the aforementioned end face of the magnetic layer 32.

The second return path section is made of a magnetic material and disposed forward of the main pole 15 along the direction T of travel of the recording medium. The second return path section is in contact with the second shield 16D and the main pole 15. The second return path section includes the yoke layer 40 and the magnetic layers 41 to 45.

The second return path section has an end face that is located away from the medium facing surface 30 and in contact with the main pole 15. The yoke layer 40 has a bottom surface located away from the medium facing surface 30. The bottom surface of the yoke layer 40 is the aforementioned end face of the second return path section. The magnetic layers 41 to 45 constitute a connection part for connecting the second shield 16D and the yoke layer 40 to each other. The connection part is located forward of the second shield 16D and the yoke layer 40 along the direction T of travel of the recording medium. A second interface S20 is formed between the main pole 15 and the aforementioned end face of the second return path section (the bottom surface of the yoke layer 40). As shown in FIG. 1, the second return path section connects the second shield 16D and the main pole 15 to each other so that a second space S2 is defined by the main pole 15, the gap part (the gap layer 18), the second shield 16D and the second return path section, thereby magnetically coupling the second shield 16D and the main pole 15 to each other.

In the present embodiment, none of the magnetic layers 41, 43 and 45 are exposed in the medium facing surface 30. The magnetic layers 41, 43 and 45 have their respective end faces facing toward the medium facing surface 30. These end faces are located at a distance from the medium facing surface 30. Part of the insulating layer 65 is interposed between the medium facing surface 30 and the aforementioned end face of the magnetic layer 41. Part of the insulating layer 67 is interposed between the medium facing surface 30 and the aforementioned end face of the magnetic layer 43. Part of the insulating layer 69 is interposed between the medium facing surface 30 and the aforementioned end face of the magnetic layer 45.

As shown in FIG. 1, the first interface S10 has a first end E1 that is closest to the medium facing surface 30, while the second interface S20 has a second end E2 that is closest to the medium facing surface 30. The second end E2 is located closer to the medium facing surface 30 than is the first end E1.

Part of the first portion 10 of the coil passes through the space S1. Part of the second portion 20 of the coil passes through the space S2. The first portion 10 and the second portion 20 will now be described in detail with reference to FIG. 3 to FIG. 6.

FIG. 3 is a plan view showing the first portion 10. The first portion 10 is wound one or more turns around the magnetic layer 33 which constitutes part of the first return path section. The first portion 10 includes one or more first coil elements extending to pass through the first space S1. Note that the coil elements refer to part of the coil winding. Where the first portion 10 is wound two or more turns around the magnetic layer 33, the first portion 10 includes two or more first coil elements extending to pass through the first space S1. In the present embodiment, in particular, the first portion 10 is wound approximately three turns around the magnetic layer 33, and includes three first coil elements 10A, 10B, and 10C extending to pass through the first space S1. The first coil elements 10A, 10B, and 10C are aligned in the direction perpendicular to the medium facing surface 30, in the listed order from the medium facing surface 30 side. The first portion 10 has a coil connection part 10E electrically connected to the second portion 20.

FIG. 4 is a plan view showing the first layer 21 of the second portion 20. The first layer 21 is wound one turn around the yoke layer 40 which constitutes part of the second return path section. The first layer 21 includes a coil element 21A that passes between the second shield 16D and the yoke layer 40, in particular, within the second space S2. The first layer 21 has a coil connection part 21S electrically connected to the coil connection part 10E of the first portion 10, and a coil connection part 21E electrically connected to the second layer 22. The coil connection part 21S is electrically connected to the coil connection part 10E via a columnar connection layer (not shown) that penetrates a plurality of layers interposed between the first layer 21 and the first portion 10. The connection layer is made of a conductive material such as copper.

FIG. 5 is a plan view showing the second layer 22 of the second portion 20. The second layer 22 is wound one turn around the magnetic layer 42 which constitutes part of the second return path section. The second layer 22 includes a coil element 22A that passes between the magnetic layers 41 and 42, in particular, within the second space S2. The second layer 22 has a coil connection part 22S penetrating the insulating film 64 and electrically connected to the coil connection part 21E of the first layer 21, and a coil connection part 22E electrically connected to the third layer 23.

FIG. 6 is a plan view showing the third layer 23 of the second portion 20. The third layer 23 is wound approximately one turn around the magnetic layer 44 which constitutes part of the second return path section. The third layer 23 includes a coil element 23A that passes between the magnetic layers 43 and 44, in particular, within the second space S2. The third layer 23 has a coil connection part 23S penetrating the insulating film 66 and electrically connected to the coil connection part 22E of the second layer 22. In the example shown in FIG. 3 to FIG. 6, the first portion 10 and the second portion 20 are connected in series.

The coil elements 21A, 22A, and 23A correspond to the one or more second coil elements according to the present invention. The one or more second coil elements include at least one first specific coil element that passes between the second shield 16D and the yoke layer 40. In the present embodiment, the one or more second coil elements are two or more second coil elements, or specifically, the three coil elements 21A, 22A, and 23A. Among them, the coil element 21A is the first specific coil element. The coil elements 22A and 23A are located forward of the coil element 21A along the direction T of travel of the recording medium. Thus, the coil elements 22A and 23A are second specific coil elements.

Figure 7:
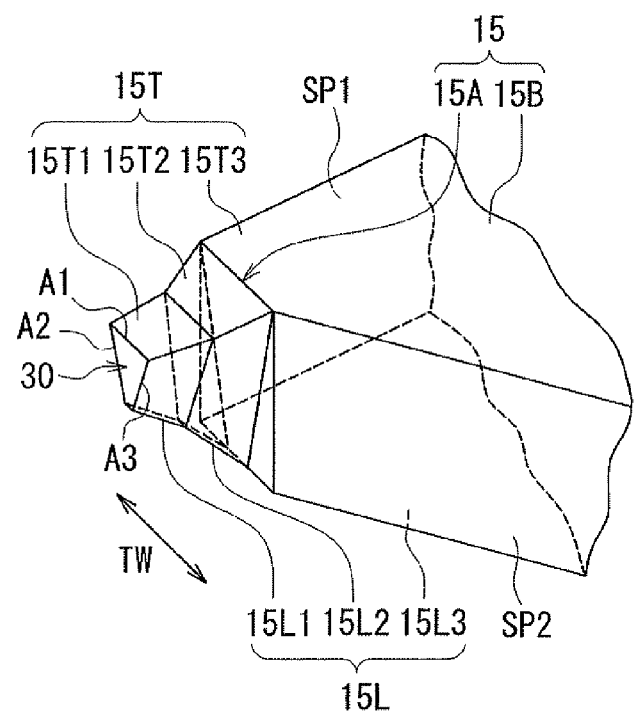
FIG. 7 is a perspective view showing a part of a main pole near the medium facing surface in the magnetic head according to the first embodiment of the invention.
Figure 8:
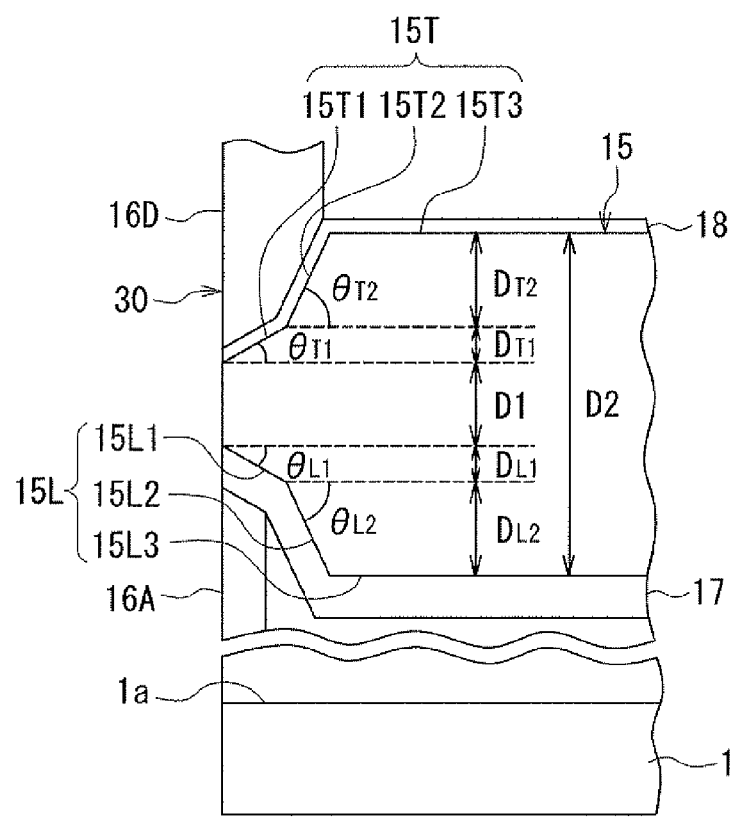
FIG. 8 is a cross-sectional view showing a part of the main pole near the medium facing surface in the magnetic head according to the first embodiment of the invention.

The shape of the main pole 15 will now be described in detail with reference to FIG. 7 and FIG. 8. FIG. 7 is a perspective view of a part of the main pole 15 in the vicinity of the medium facing surface 30. FIG. 8 is a cross-sectional view of a part of the main pole 15 in the vicinity of the medium facing surface 30. As shown in FIG. 7, the main pole 15 includes a track width defining portion 15A and a wide portion 15B. The track width defining portion 15A has an end face located in the medium facing surface 30, and an end opposite to the end face. The wide portion 15B is connected to the end of the track width defining portion 15A. As shown in FIG. 7 and FIG. 8, the main pole 15 has: the bottom end 15L which is the end closer to the top surface 1a of the substrate 1; the top surface 15T opposite to the bottom end 15L; the first side part SP1; and the second side part SP2. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 30. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 30, then becoming constant. Here, the length of the track width defining portion 15A in the direction perpendicular to the medium facing surface 30 will be referred to as neck height. The neck height falls within the range of 0 to 0.3 μm, for example. A zero neck height means that no track width defining portion 15A exists and an end face of the wide portion 15B is thus located in the medium facing surface 30.

The bottom end 15L includes a first portion 15L1, a second portion 15L2, and a third portion 15L3 that are contiguously arranged in order of increasing distance from the medium facing surface 30. The first portion 15L1 has an end located in the medium facing surface 30. Each of the first and second portions 15L1 and 15L2 may be an edge formed by two intersecting planes, or may be a plane connecting two planes to each other. The third portion 15L3 is a plane extending in a direction substantially perpendicular to the medium facing surface 30. The top surface 15T includes a fourth portion 15T1, a fifth portion 15T2, and a sixth portion 15T3 that are contiguously arranged in order of increasing distance from the medium facing surface 30. The fourth portion 15T1 has an end located in the medium facing surface 30.

As shown in FIG. 8, the distance from the top surface 1a of the substrate 1 to any given point on each of the first and second portions 15L1 and 15L2 decreases with increasing distance from the given point to the medium facing surface 30. The first portion 15L1 has an angle of inclination $\theta_{L1}$ with respect to the direction perpendicular to the medium facing surface 30, and the second portion 15L2 has an angle of inclination $\theta_{L2}$ with respect to the direction perpendicular to the medium facing surface 30, $\theta_{L2}$ being greater than $\theta_{L1}$. The first shield 16A has a top surface that is opposed to the first portion 15L1 with the gap part (the first gap layer 17) interposed therebetween. The distance from the top surface 1a of the substrate 1 to any given point on the top surface of the first shield 16A decreases with increasing distance from the given point to the medium facing surface 30.

The distance from the top surface 1a of the substrate 1 to any given point on each of the fourth and fifth portions 15T1 and 15T2 increases with increasing distance from the given point to the medium facing surface 30. The fourth portion 15T1 has an angle of inclination $\theta_{T1}$ with respect to the direction perpendicular to the medium facing surface 30, and the fifth portion 15T2 has an angle of inclination $\theta_{T2}$ with respect to the direction perpendicular to the medium facing surface 30, $\theta_{T2}$ being greater than $\theta_{T1}$. The sixth portion 15T3 extends in the direction substantially perpendicular to the medium facing surface 30. The second shield 16D has a bottom surface that is opposed to the fourth and fifth portions 15T1 and 15T2 with the gap part (the second gap layer 18) interposed therebetween. The distance from the top surface 1a of the substrate 1 to any given point on the bottom surface of the second shield 16D increases with increasing distance from the given point to the medium facing surface 30.

Both the angle of inclination $\theta_{L1}$ of the first portion 15L1 and the angle of inclination $\theta_{T1}$ of the fourth portion 15T1 preferably fall within the range of 15° to 45°. Both the angle of inclination $\theta_{L2}$ of the second portion 15L2 and the angle of inclination $\theta_{T2}$ of the fifth portion 15T2 preferably fall within the range of 45° to 85°.

As shown in FIG. 7, the end face of the main pole 15 located in the medium facing surface 30 has a first side A1 adjacent to the second gap layer 18, a second side A2 connected to a first end of the first side A1, and a third side A3 connected to a second end of the first side A1. The first side A1 defines the track width. The position of an end of a record bit to be recorded on the recording medium depends on the position of the first side A1. The end face of the main pole 15 located in the medium facing surface 30 decreases in width in the track width direction TW with increasing proximity to the bottom end 15L of the main pole 15, that is, with increasing proximity to the top surface 1a of the substrate 1. Each of the second side A2 and the third side A3 is at an angle in the range of, for example, 7° to 17°, or preferably in the range of 10° to 15°, with respect to the direction perpendicular to the top surface of the substrate 1. The first side A1 has a length in the range of 0.05 to 0.20 µm, for example.

Here, as shown in FIG. 8, let D1 be the thickness (length in the direction perpendicular to the top surface 1a of the substrate 1) of the main pole 15 at the medium facing surface 30, and D2 be the distance between the third portion 15L3 and the sixth portion 15T3. Let also $D_{L1}$ be the length in the direction perpendicular to the top surface 1a of the substrate 1 between two ends of the first portion 15L1 that are opposite to each other in that direction. Let also $D_{L2}$ be the length in the direction perpendicular to the top surface 1a of the substrate 1 between two ends of the second portion 15L2 that are opposite to each other in that direction. Let $D_{T1}$ be the length in the direction perpendicular to the top surface 1a of the substrate 1 between two ends of the fourth portion 15T1 that are opposite to each other in that direction. Let also $D_{T2}$ be the length in the direction perpendicular to the top surface 1a of the substrate 1 between two ends of the fifth portion 15T2 that are opposite to each other in that direction. For example, D1 falls within the range of 0.05 to 0.2 µm, while D2 falls within the range of 0.4 to 0.8 µm. For instance, $D_{L1}$ is greater than 0 and equal to or smaller than 0.3 µm, while $D_{L2}$ falls within the range of 0.15 to 0.3 µm. Furthermore, by way of example, $D_{T1}$ is greater than 0 and equal to or smaller than 0.3 µm, while $D_{T2}$ falls within the range of 0.15 to 0.3 µm.

FIG. 7 shows an example where the distance from the medium facing surface 30 to the boundary between the second portion 15L2 and the third portion 15L3, and the distance from the medium facing surface 30 to the boundary between the fifth portion 15T2 and the sixth portion 15T3, are both equal to the neck height, i.e., the distance from the medium facing surface 30 to the boundary between the track width defining portion 15A and the wide portion 15B. Nevertheless, the distance from the medium facing surface 30 to the boundary between the second portion 15L2 and the third portion 15L3, and the distance from the medium facing surface 30 to the boundary between the fifth portion 15T2 and the sixth portion 15T3, may each be smaller or greater than the neck height.

As shown in FIG. 2, in the medium facing surface 30, the distance between the first and second side parts SP1 and SP2 of the main pole 15 in the track width direction TW decreases with increasing proximity to the top surface 1a of the substrate 1. Likewise, in the medium facing surface 30, the distance between the first and second sidewalls SW1 and SW2 of the side shields 16B and 16C in the track width direction TW decreases with increasing proximity to the top surface 1a of the substrate 1. In the medium facing surface 30, the first side part SP1 and the first sidewall SW1 are substantially parallel to each other, and the second side part SP2 and the second sidewall SW2 are also substantially parallel to each other. In the medium facing surface 30, the distance between the first side part SP1 and the first sidewall SW1 and the distance between the second side part SP2 and the second sidewall SW2 are equal. These distances will hereinafter be denoted as G1. G1 falls within the range of 20 to 80 nm, for example. Here, let G2 be the distance between the bottom end 15L of the main pole 15 and the first shield 16A in the medium facing surface 30. G2 is greater than G1 and equal to or smaller than three times G1. This relationship is achieved by forming the first gap layer 17 and the main pole 15 after the formation of the side shields 16B and 16C having the sidewalls SW1 and SW2.

The function and effects of the magnetic head according to the present embodiment will now be described. The magnetic head writes data on a recording medium with the write head and reads data written on the recording medium with the read head. In the write head, the coil including the first and second portions 10 and 20 produces magnetic fields corresponding to data to be written on the recording medium. A magnetic flux corresponding to the magnetic field produced by the first portion 10 passes through the first return path section and the main pole 15. A magnetic flux corresponding to the magnetic field produced by the second portion 20 passes through the second return path section and the main pole 15. Consequently, the main pole 15 allows the magnetic flux corresponding to the magnetic field produced by the first portion 10 and the magnetic flux corresponding to the magnetic field produced by the second portion 20 to pass.

The first and second portions 10 and 20 may be connected in series or in parallel. In either case, the first and second portions 10 and 20 are connected such that the magnetic flux corresponding to the magnetic field produced by the first portion 10 and the magnetic flux corresponding to the magnetic field produced by the second portion 20 flow in the same direction through the main pole 15.

The main pole 15 allows the magnetic fluxes corresponding to the magnetic fields produced by the coil to pass as mentioned above, and produces a write magnetic field for writing data on the recording medium by means of the perpendicular magnetic recording system.

The shields 16A, 16B, 16C and 16D capture a disturbance magnetic field applied to the magnetic head from the outside thereof. This allows preventing erroneous writing on the recording medium induced by the disturbance magnetic field intensively captured into the main pole 15. The shields 16A, 16B, 16C and 16D also function to capture a magnetic flux that is produced from the end face of the main pole 15 and that expands in directions other than the direction perpendicular to the plane of the recording medium, and to thereby prevent the magnetic flux from reaching the recording medium.

Furthermore, the shields 16A, 16B, 16C and 16D and the first and second return path sections function to allow a magnetic flux that has been produced from the end face of the main pole 15 and has magnetized the recording medium to flow back. More specifically, a part of the magnetic flux that has been produced from the end face of the main pole 15 and has magnetized the recording medium flows back to the main pole 15 through the shield 16A and the first return path section. Another part of the magnetic flux that has been produced from the end face of the main pole 15 and has magnetized the recording medium flows back to the main pole 15 through the shield 16D and the second return path section.

In the medium facing surface 30, the end faces of the shields 16A, 16B, 16C, and 16D are arranged to wrap around the end face of the main pole 15. The present embodiment thus makes it possible that, in regions both backward and forward of the end face of the main pole 15 along the direction T of travel of the recording medium and regions on opposite sides of the end face of the main pole 15 in the track width direction TW, a magnetic flux that is produced from the end face of the main pole 15 and expands in directions other than the direction perpendicular to the plane of the recording medium can be captured and thereby prevented from reaching the recording medium. Consequently, the present embodiment allows preventing the skew-induced adjacent track erase. The first and second shields 16A and 16D contribute to an increase in the gradient of the write magnetic field, as well as the prevention of the skew-induced adjacent track erase. The side shields 16B and 16C greatly contribute to the prevention of adjacent track erase, in particular. According to the present embodiment, such functions of the shields 16A, 16B, 16C and 16D serve to increase the recording density.

Furthermore, as shown in FIG. 2, the present embodiment is configured so that in the medium facing surface 30, the distance between the first and second side parts SP1 and SP2 of the main pole 15 in the track width direction TW, i.e., the width of the end face of the main pole 15, decreases with increasing proximity to the top surface 1a of the substrate 1. According to the present embodiment, this feature also serves to prevent the skew-induced adjacent track erase.

The present embodiment is also configured so that in the medium facing surface 30, the distance between the first and second sidewalls SW1 and SW2 of the side shields 16B and 16C in the track width direction TW decreases with increasing proximity to the top surface 1a of the substrate 1, as does the distance between the first and second side parts SP1 and SP2 of the main pole 15. The present embodiment thus makes it possible that the distance between the first side part SP1 and the first sidewall SW1 and the distance between the second side part SP2 and the second sidewall SW2 are both small and constant in the medium facing surface 30. This configuration allows the side shields 16B and 16C to effectively capture the magnetic flux that is produced from the end face of the main pole 15 and expands to opposite sides in the track width direction TW. As a result, the present embodiment can enhance the function of the side shields 16B and 16C in particular, and thereby prevent the skew-induced adjacent track erase more effectively.

The shields 16A to 16D cannot capture much magnetic flux if the shields 16A to 16D are not magnetically connected with any magnetic layer having a sufficiently large volume enough to accommodate the magnetic flux captured by the shields 16A to 16D. In the present embodiment, there are provided the first return path section (the magnetic layers 31 to 36) which magnetically couples the first shield 16A and the main pole 15 to each other, and the second return path section (the yoke layer 40 and the magnetic layers 41 to 45) which magnetically couples the second shield 16D and the main pole 15 to each other. Such a configuration allows the magnetic flux captured by the shields 16A to 16D to flow into the main pole 15 by way of the first and second return path sections. In the present embodiment, the first and second return path sections and the main pole 15, which are magnetic layers large in volume, are magnetically connected to the shields 16A to 16D. The present embodiment thus allows the shields 16A to 16D to capture much magnetic flux, so that the above-described effect of the shields 16A to 16D can be exerted effectively.

Furthermore, the present embodiment is provided with the first shield 16A in addition to the first return path section. In the main cross section, the magnetic layer 31, which is located farthest from the main pole 15 among the magnetic layers 31 to 36 constituting the first return path section, is greater than the first shield 16A in length in the direction perpendicular to the medium facing surface 30. The first portion 10 of the coil passes through the space S1. According to the present embodiment, such a structure is more advantageous than a structure where the magnetic layer 31 also functions as the first shield. That is, the present embodiment allows the first shield 16A and the main pole 15 to be in sufficiently close proximity to each other. This enhances the function of the first shield 16A.

Now, a description will be made as to the role of the magnetic layers 34 and 32. First, suppose a case where the magnetic layers 34 and 32 are not provided and thus the first shield 16A and the magnetic layer 31 are not magnetically coupled to each other. In this case, the magnetic flux that has been captured by the first shield 16A or the side shields 16B and 16C and directed downward cannot flow toward the magnetic layer 31, and thus returns so as to proceed upward. This causes the first shield 16A or the side shields 16B and 16C to produce upwardly and downwardly directed magnetic fluxes. As a result, part of the magnetic flux captured by the first shield 16A or the side shields 16B and 16C leaks out of the medium facing surface 30. This may cause adjacent track erase. In contrast to this, if the first shield 16A and the magnetic layer 31 are magnetically coupled to each other by the magnetic layers 34 and 32, the magnetic flux captured by the side shields 16B and 16C is divided to flow upward and downward, and the magnetic flux captured by the first shield 16A is mainly directed downward. This can prevent the adjacent track erase that may be caused by part of the magnetic flux captured by the first shield 16A or the side shields 16B and 16C being leaked out of the medium facing surface 30.

If the end face of the magnetic layer 32 is exposed in the medium facing surface 30, the insulating layer 53 would expand due to heat generated by the first portion 10 of the coil. As a result, the end face of the magnetic layer 32, i.e., part of the medium facing surface 30, would protrude. In contrast to this, in the present embodiment, the insulating layer 54 harder than the magnetic layer 32 is provided between the magnetic layer 32 and the medium facing surface 30. The insulating layer 54 exists across a wider area than does the magnetic layer 32. The insulating layer 54 therefore functions to prevent changes in the position of the magnetic layer 32 due to the heat generated by the first portion 10. Thus, the present embodiment makes it possible to prevent part of the medium facing surface 30 from protruding due to the heat generated by the first portion 10.

If the first shield 16A is excessively long in the direction perpendicular to the medium facing surface 30 in the main cross section, flux leakage from the main pole 15 to the first shield 16A increases and the main pole 15 thus becomes unable to direct much magnetic flux to the medium facing surface 30. It is therefore necessary that the first shield 16A is not excessively long in the direction perpendicular to the medium facing surface 30 in the main cross section. In the main cross section, if the length of each of the magnetic layers 34 and 32 in the direction perpendicular to the medium facing surface 30 is equal to or smaller than that of the first shield 16A, the magnetic layers 34 and 32 cannot direct much magnetic flux from the first shield 16A to the magnetic layer 31. In contrast to this, the present embodiment is configured so that in the main cross section, each of the magnetic layers 34 and 32 is greater than the first shield 16A and smaller than the magnetic layer 31 in length in the direction perpendicular to the medium facing surface 30. Consequently, the present embodiment allows the magnetic layers 34 and 32 to direct much magnetic flux from the first shield 16A to the magnetic layer 31.

The position of an end of a record bit to be recorded on the recording medium depends on the position of an end of the end face of the main pole 15 located in the medium facing surface 30, the end being located forward along the direction T of travel of the recording medium. Accordingly, in order to define the position of the end of the record bit accurately, it is particularly important for the second shield 16D, of the first and second shields 16A and 16D, to be capable of capturing as much magnetic flux as possible. In the present embodiment, the second shield 16D is larger in volume than the first shield 16A and is thus capable of capturing more magnetic flux than the first shield 16A.

Additionally, as the frequency of the recording signal is increased in order to increase the recording density, the magnetic head is required to be improved in the rate of change in the direction of the magnetic flux produced from the end face of the main pole 15. To satisfy this requirement, it is particularly effective to shorten the length of a magnetic path that passes through the second shield 16D capturing much magnetic flux and the main pole 15, i.e., a magnetic path that passes through the second shield 16D, the second return path section and the main pole 15. For the reasons to be described below, the present embodiment allows reducing the length of the magnetic path that passes through the second shield 16D, the second return path section and the main pole 15.

In the present embodiment, the second end E2 of the second interface S20 between the main pole 15 and the end face of the second return path section is located closer to the medium facing surface 30 than is the first end E1 of the first interface S10 between the main pole 15 and the end face of the first return path section. This configuration allows reducing the distance between the second shield 16D and the second interface S20. The present embodiment is configured in particular so that the first coil elements 10A, 10B, and 10C are aligned in the direction perpendicular to the medium facing surface 30, and the first specific coil element 21A passing between the second shield 16D and the yoke layer 40 is smaller in number than the first coil elements 10A, 10B and 10C. The coil elements 22A and 23A, which are the second specific coil elements, are located forward of the coil element 21A along the direction T of travel of the recording medium. Such a layout of the first and second coil elements makes it possible that the second end E2 of the second interface S20 is located closer to the medium facing surface 30 than is the first end E1 of the first interface S10 as mentioned above. To reduce the length of the magnetic path of the second return path section, it is especially important that the second end E2 of the second interface S20 is located closer to the medium facing surface 30.

In the present embodiment, the one or more second coil elements extending to pass through the second space S2 include at least one first specific coil element 21A passing between the second shield 16D and the yoke layer 40. This configuration allows making the maximum distance between the second return path section and the main pole 15 in the direction T of travel of the recording medium smaller than that in the case where the one or more second coil elements do not include any first specific coil element passing between the second shield 16D and the yoke layer 40. The coil elements 21A, 21B, and 21C can be reduced in thickness. Therefore, the configuration where the coil elements 21A, 21B and 21C are aligned in the direction T of travel of the recording medium is more advantageous in reducing the length of the magnetic path of the second return path section, as compared with a configuration where the coil elements 21A, 21B and 21C are aligned in a direction perpendicular to the medium facing surface 30.

As can be seen from the above discussions, the present embodiment allows reducing the length of the magnetic path of the second return path section. Consequently, according to the present embodiment, it is possible to reduce the length of the magnetic path that passes through the second shield 16D capturing much magnetic flux and the main pole 15, i.e., the magnetic path that passes through the second shield 16D, the second return path section and the main pole 15. This allows improving the rate of change in the direction of the magnetic flux produced from the end face of the main pole 15.

The other effects provided by the present embodiment will now be described. In the present embodiment, the bottom end 15L of the main pole 15 includes the first portion 15L1, the second portion 15L2, and the third portion 15L3 that are contiguously arranged in order of increasing distance from the medium facing surface 30. The top surface 15T of the main pole 15 includes the fourth portion 15T1, the fifth portion 15T2, and the sixth portion 15T3 that are contiguously arranged in order of increasing distance from the medium facing surface 30. The distance from the top surface 1a of the substrate 1 to any given point on each of the first and second portions 15L1 and 15L2 decreases with increasing distance from the given point to the medium facing surface 30. The distance from the top surface 1a of the substrate 1 to any given point on each of the fourth and fifth portions 15T1 and 15T2 increases with increasing distance from the given point to the medium facing surface 30. Consequently, the present embodiment allows the main pole 15 to have a small thickness in the medium facing surface 30. It is thus possible to prevent the skew-induced adjacent track erase. The present embodiment further allows the main pole 15 to have a great thickness in the part away from the medium facing surface 30. This allows the main pole 15 to direct much magnetic flux to the medium facing surface 30, and consequently allows improving write characteristics such as overwrite property.

For the main pole 15 of the present embodiment, the angles of inclination $\theta_{L1}$ and $\theta_{T1}$ of the first and fourth portions 15L1 and 15T1 can be reduced to thereby suppress variations in write characteristics associated with changes in level of the medium facing surface 30. Furthermore, for the main pole 15, the angles of inclination $\theta_{L2}$ and $\theta_{T2}$ of the second and fifth portions 15L2 and 15T2 can be increased to thereby provide a great distance D2 between the third portion 15L3 and the sixth portion 15T3 while achieving a small thickness D1 of the main pole 15 in the medium facing surface 30 shown in FIG. 8. This allows preventing the skew-induced problems and improving write characteristics. Consequently, according to the present embodiment, it is possible to prevent the skew-induced problems and to improve write characteristics while suppressing variations in write characteristics associated with changes in level of the medium facing surface 30.

Second Embodiment

Figure 9:
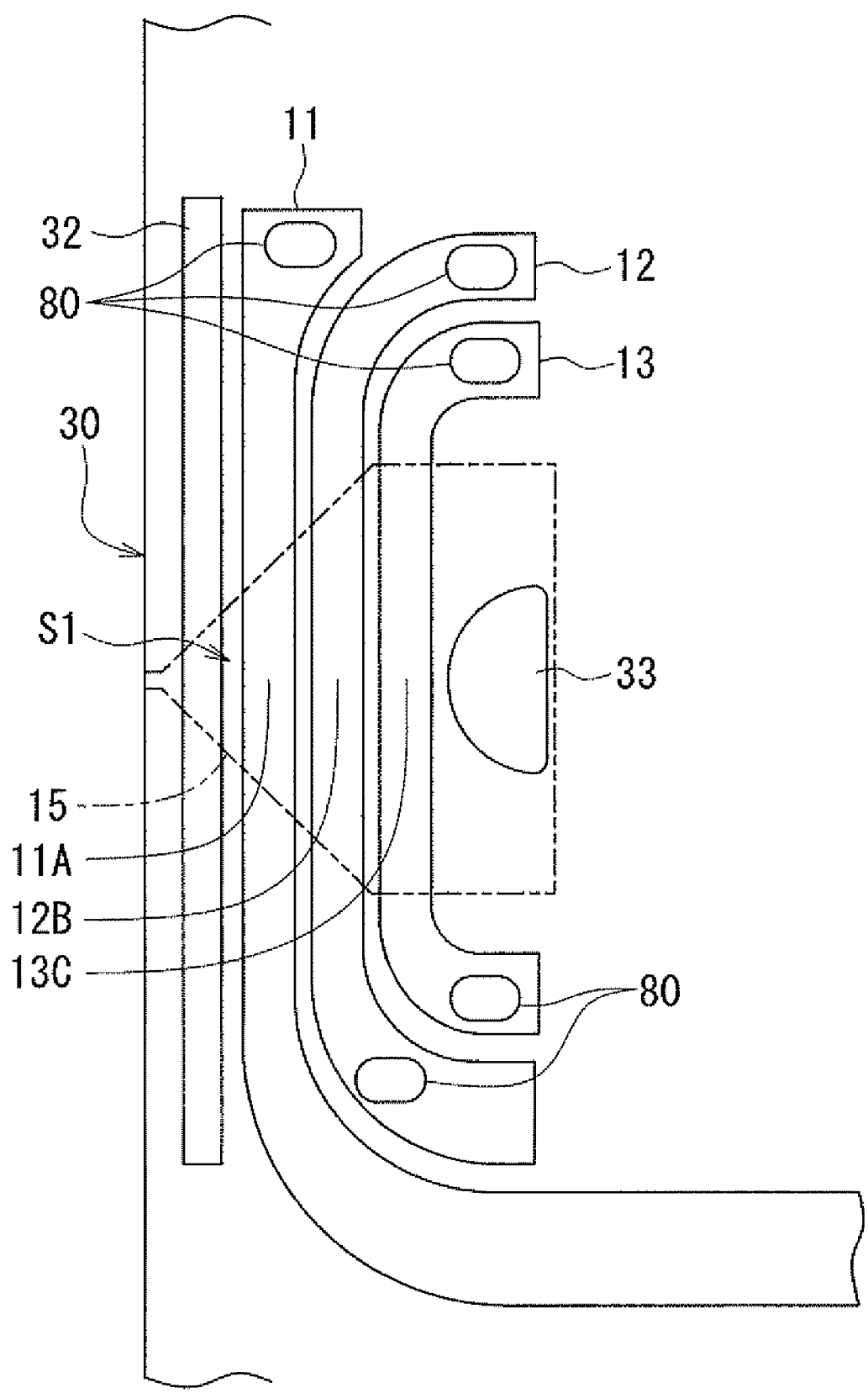
FIG. 9 is a plan view showing a plurality of first coil elements of a coil in a magnetic head according to a second embodiment of the invention.
Figure 10:
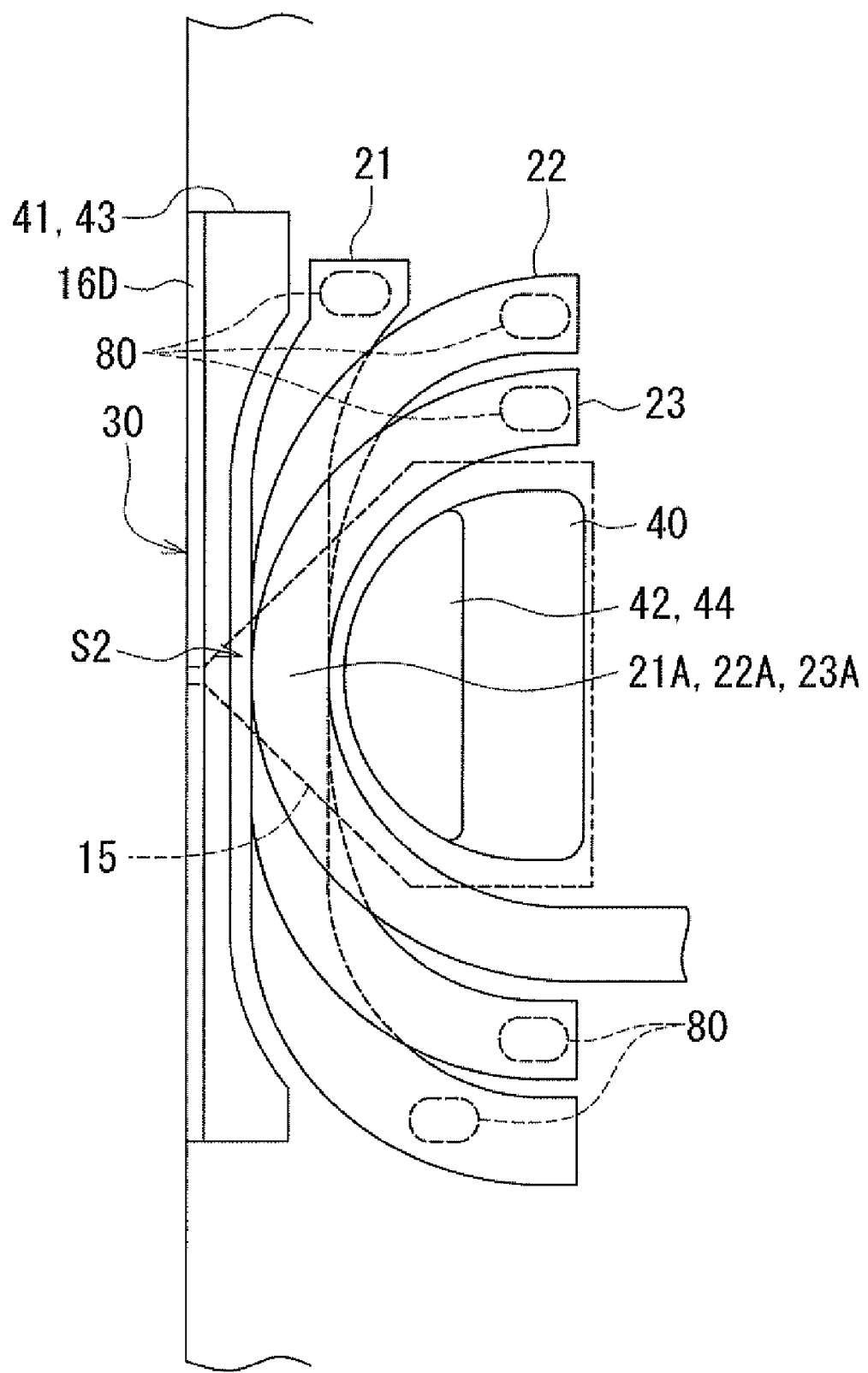
FIG. 10 is a plan view showing a plurality of second coil elements of the coil in the magnetic head according to the second embodiment of the invention.

A magnetic head according to a second embodiment of the invention will now be described with reference to FIG. 9 and FIG. 10. FIG. 9 is a plan view showing a plurality of first coil elements of the coil in the magnetic head according to the present embodiment. FIG. 10 is a plan view showing a plurality of second coil elements of the coil in the magnetic head according to the present embodiment.

The magnetic head according to the present embodiment is different from the magnetic head according to the first embodiment in the following respects. In the magnetic head according to the present embodiment, the coil is wound approximately three turns around the main pole 15. The coil of the present embodiment has three line-shaped portions 11, 12 and 13 shown in FIG. 9, instead of the first portion 10 of the first embodiment shown in FIG. 3. The coil of the present embodiment further has first to third layers 21, 22 and 23 shaped as shown in FIG. 9, instead of the first to third layers 21, 22 and 23 of the first embodiment shown in FIG. 4 to FIG. 6.

As shown in FIG. 9, the line-shaped portions 11, 12 and 13 respectively include first coil elements 11A, 12B and 13C that extend to pass through the first space S1. The first coil elements 11A, 12B and 13C are aligned in the direction perpendicular to the medium facing surface 30, in the listed order from the medium facing surface 30 side.

As shown in FIG. 10, the first to third layers 21, 22 and 23 of the present embodiment respectively include second coil elements 21A, 22A and 23A that extend to pass through the second space S2. The coil element 21A passes between the second shield 16D and the yoke layer 40, in particular. The coil element 22A passes between the magnetic layers 41 and 42, in particular. The coil element 23A passes between the magnetic layers 43 and 44, in particular. As in the first embodiment, the coil element 21A is the first specific coil element, while the coil elements 22A and 23A are the second specific coil elements.

The line-shaped portions 11, 12 and 13 are electrically connected to the first to third layers 21, 22 and 23 via five columnar connection layers 80, which penetrate a plurality of layers interposed therebetween, so as to form a coil that is wound helically around the main pole 15.

The remainder of configuration, function and effects of the present embodiment are similar to those of the first embodiment.

Third Embodiment

Figure 11:
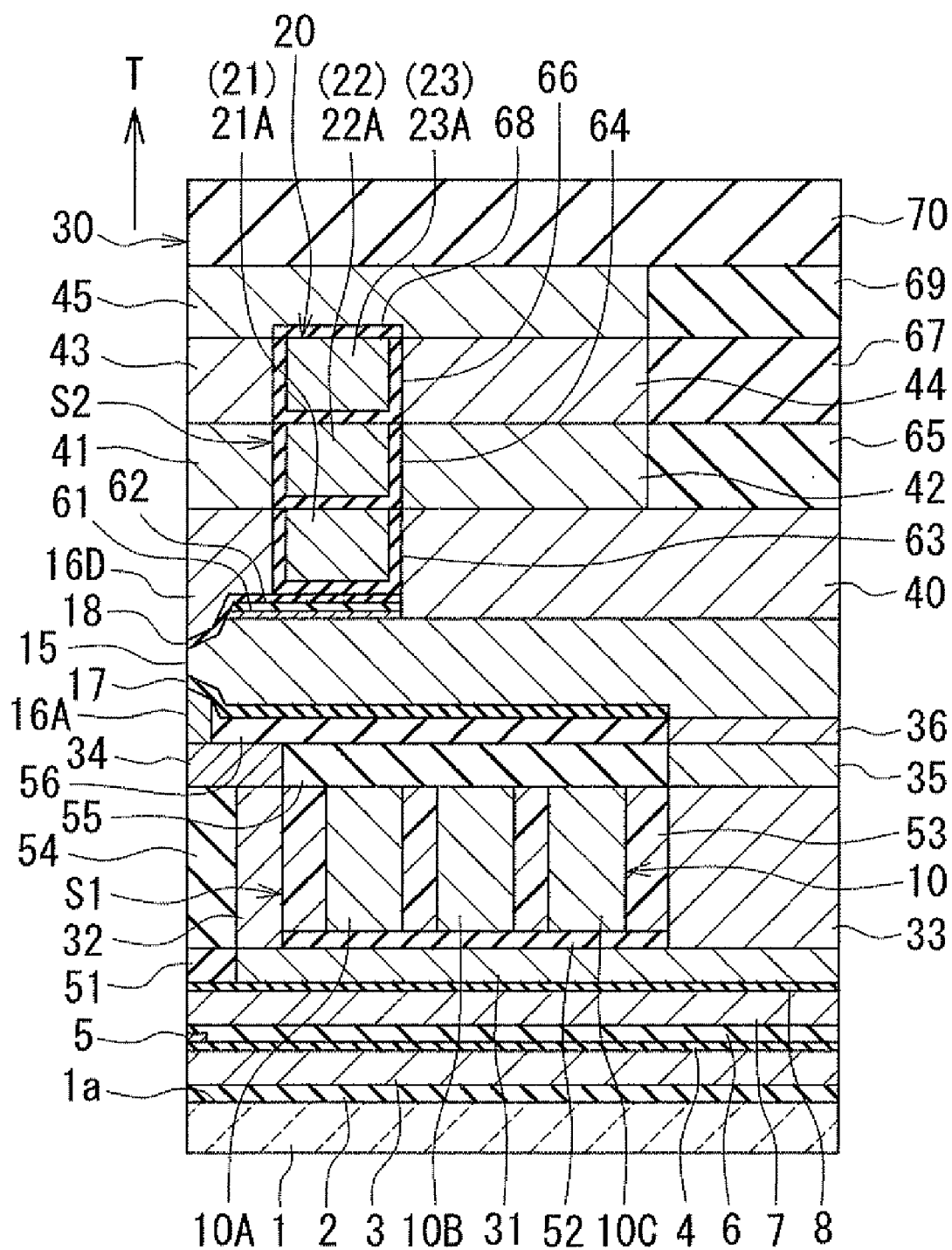
FIG. 11 is a cross-sectional view of a magnetic head according to a third embodiment of the invention.

A magnetic head according to a third embodiment of the invention will now be described with reference to FIG. 11. FIG. 11 is a cross-sectional view of the magnetic head according to the present embodiment. FIG. 11 shows a cross section perpendicular to the medium facing surface and the top surface of the substrate, or the main cross section, in particular.

The magnetic head according to the present embodiment is different from the magnetic head according to the first embodiment in the following respects. In the magnetic head according to the present embodiment, each of the magnetic layers 41, 43 and 45 has an end face located in the medium facing surface 30. FIG. 11 shows an example where the coil includes the first portion 10 and the second portion 20 as in the first embodiment. However, the coil of the present embodiment may be configured to be wound helically around the main pole 15 as in the second embodiment.

The remainder of configuration, function and effects of the present embodiment are similar to those of the first or second embodiment.

Fourth Embodiment

Figure 12:
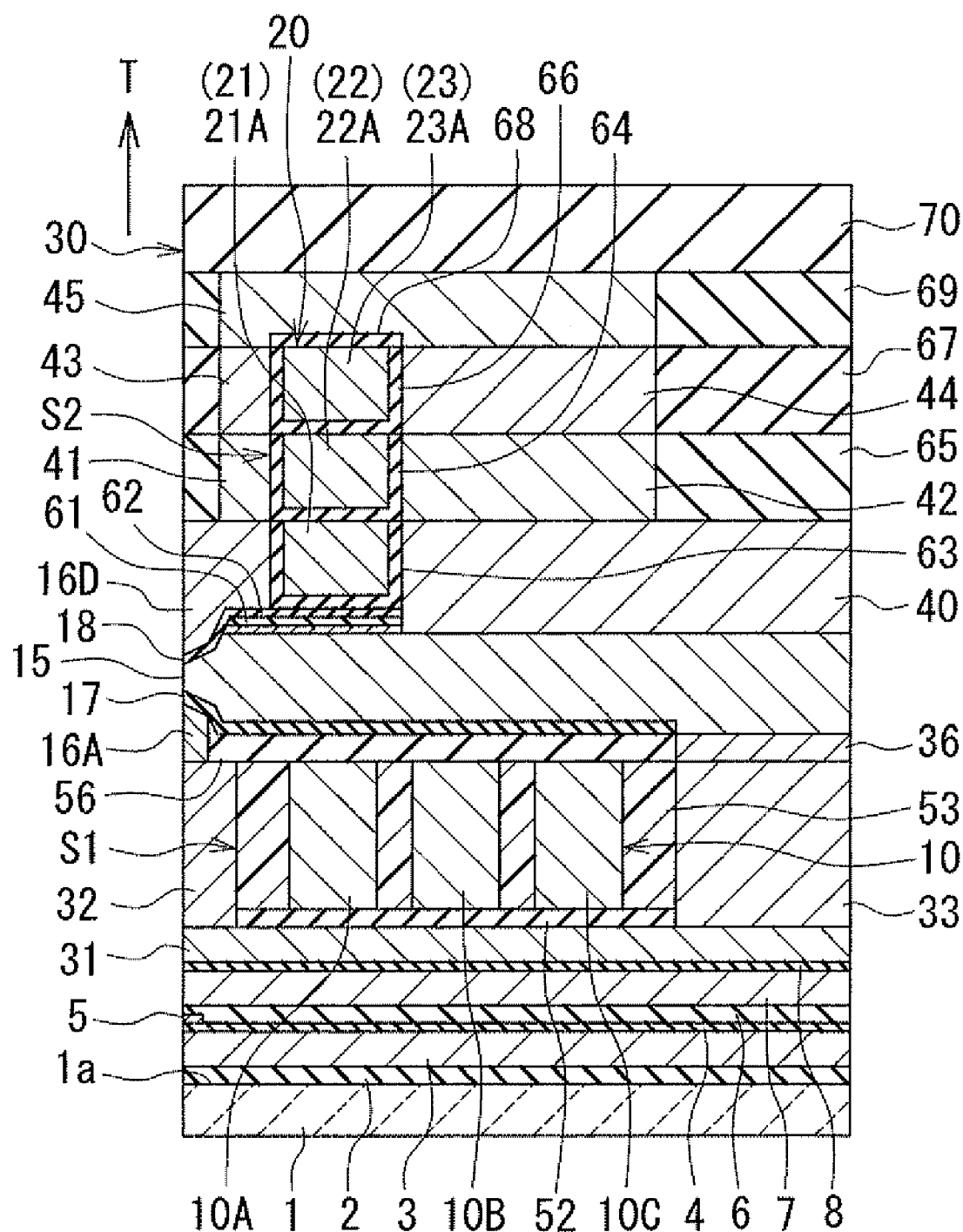
FIG. 12 is a cross-sectional view of a magnetic head according to a fourth embodiment of the invention.

A magnetic head according to a fourth embodiment of the invention will now be described with reference to FIG. 12. FIG. 12 is a cross-sectional view of the magnetic head according to the present embodiment. FIG. 12 shows a cross section perpendicular to the medium facing surface and the top surface of the substrate, or the main cross section, in particular.

The magnetic head according to the present embodiment is different from the magnetic head according to the first embodiment in the following respects. In the magnetic head according to the present embodiment, each of the magnetic layers 31 and 32 has an end face located in the medium facing surface 30. The present embodiment is without the magnetic layers 34 and 35 and the insulating layer 55 of the first embodiment. The first shield 16A is disposed on the magnetic layer 32. The magnetic layer 36 is disposed on the magnetic layer 33. The insulating layer 56 is disposed on the top surfaces of the first portion 10 of the coil and the insulating layer 53.

FIG. 12 shows an example where the coil includes the first portion 10 and the second portion 20 as in the first embodiment. However, the coil of the present embodiment may be configured to be wound helically around the main pole 15 as in the second embodiment.

The remainder of configuration, function and effects of the present embodiment are similar to those of the first or second embodiment.

Fifth Embodiment

Figure 13:
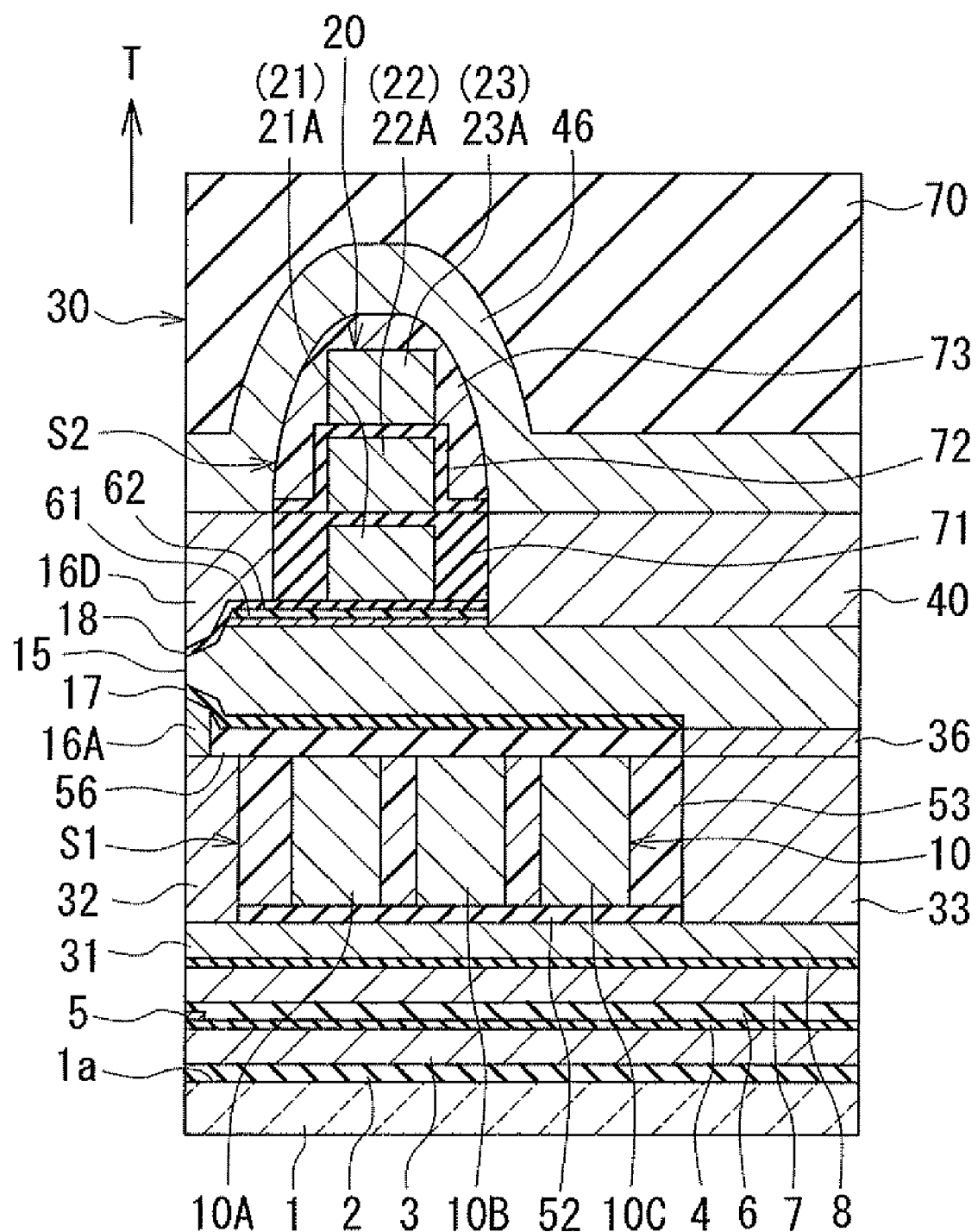
FIG. 13 is a cross-sectional view of a magnetic head according to a fifth embodiment of the invention.

A magnetic head according to a fifth embodiment of the invention will now be described with reference to FIG. 13. FIG. 13 is a cross-sectional view of the magnetic head according to the present embodiment. FIG. 13 shows a cross section perpendicular to the medium facing surface and the top surface of the substrate, or the main cross section, in particular.

The magnetic head according to the present embodiment is different from the magnetic head according to the fourth embodiment in the following respects. The magnetic head according to the present embodiment is without the insulating films 63, 64, 66 and 68 and the insulating layers 65, 67 and 69 of the fourth embodiment (the first embodiment). In the present embodiment, the first layer 21 of the second portion 20 of the coil is disposed on the second gap layer 18. The second gap layer 18 of the present embodiment is made of an insulating material such as alumina. The magnetic head according to the present embodiment has an insulating layer 71 made of an insulating material and disposed to cover the first layer 21. The insulating layer 71 is made of alumina, for example. The top surfaces of the second shield 16D, the yoke layer 40 and the insulating layer 71 are even with each other.

In the present embodiment, the second layer 22 of the second portion 20 is disposed on the insulating layer 71. The magnetic head according to the present embodiment has an insulating layer 72 made of an insulating material and disposed to cover the second layer 22. The insulating layer 72 is made of alumina, for example. The third layer 23 of the second portion 20 is disposed on the insulating layer 72. The magnetic head further has an insulating layer 73 made of an insulating material and disposed to cover the third layer 23 and the insulating layer 72. The insulating layer 73 is made of photoresist, for example.

The magnetic head according to the present embodiment has a magnetic layer 46 instead of the magnetic layers 41 to 45 of the fourth embodiment (the first embodiment). The magnetic layer 46 is disposed over the second shield 16D, the yoke layer 40 and the insulating layer 73, and connects the second shield 16D and the yoke layer 40 to each other. The magnetic layer 46 has an end face located in the medium facing surface 30. The second return path section of the present embodiment is composed of the yoke layer 40 and the magnetic layer 46. The magnetic layer 46 constitutes a connection part of the second return path section. The protection layer 70 is disposed to cover the magnetic layer 46.

FIG. 13 shows an example where the coil includes the first portion 10 and the second portion 20 as in the fourth embodiment (the first embodiment). However, the coil of the present embodiment may be configured to be wound helically around the main pole 15 as in the second embodiment.

The remainder of configuration, function and effects of the present embodiment are similar to those of the fourth embodiment.

Sixth Embodiment

Figure 14:
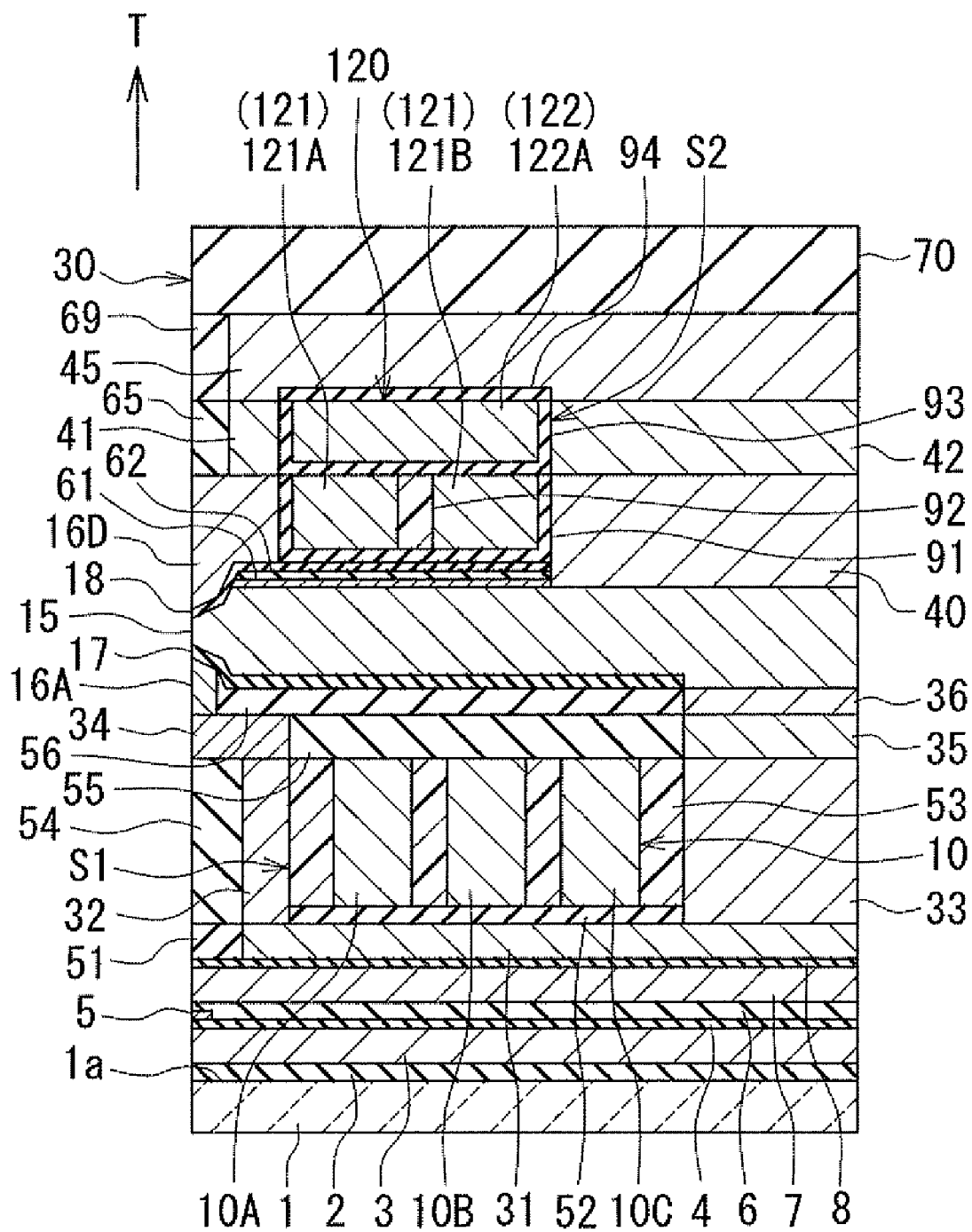
FIG. 14 is a cross-sectional view of a magnetic head according to a sixth embodiment of the invention.
Figure 15:
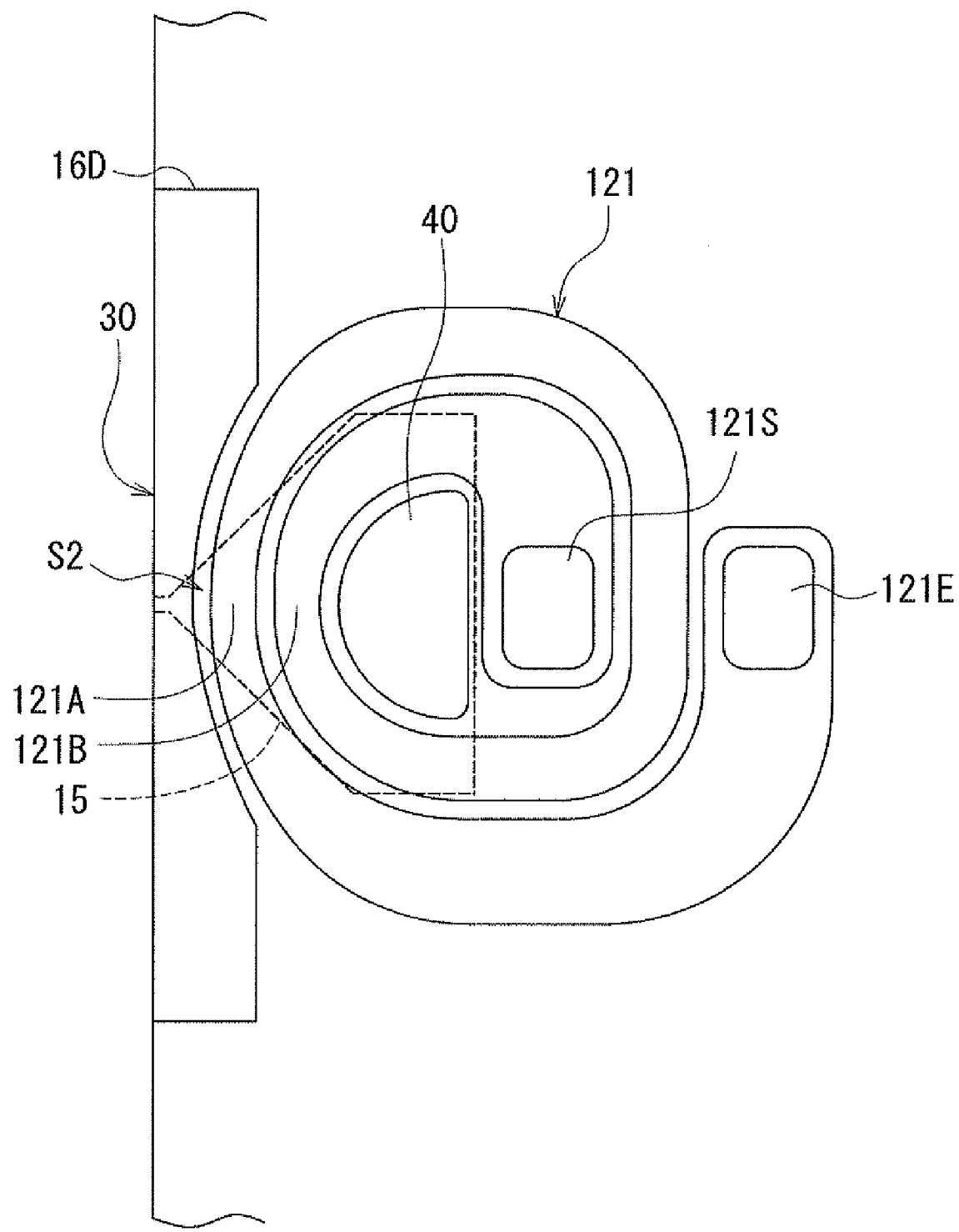
FIG. 15 is a plan view showing a first layer of a second portion of a coil in the magnetic head according to the sixth embodiment of the invention.
Figure 16:
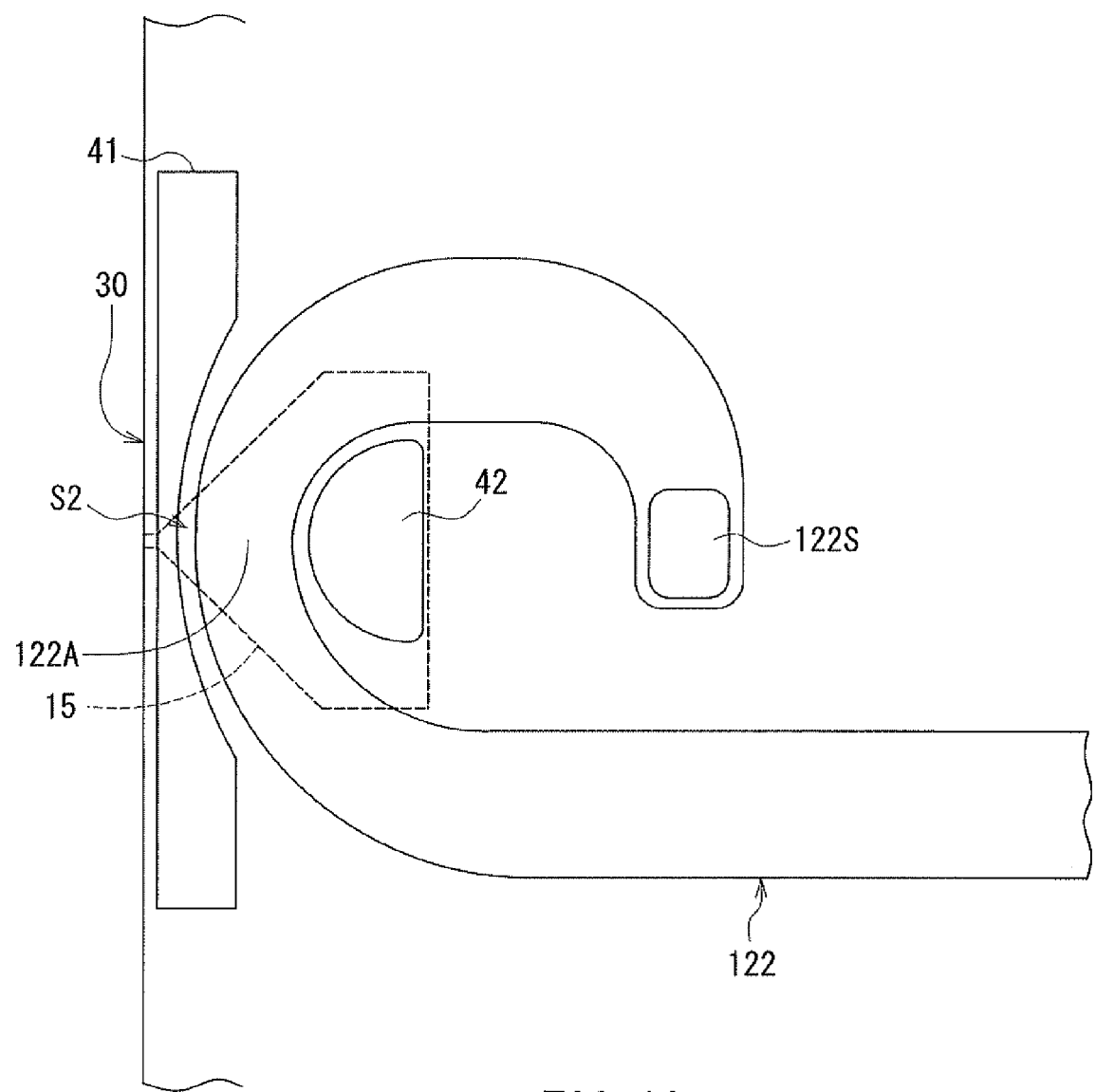
FIG. 16 is a plan view showing a second layer of the second portion of the coil in the magnetic head according to the sixth embodiment of the invention.

A magnetic head according to a sixth embodiment of the invention will now be described with reference to FIG. 14 to FIG. 16. FIG. 14 is a cross-sectional view of the magnetic head according to the present embodiment. FIG. 14 shows a cross section perpendicular to the medium facing surface and the top surface of the substrate, or the main cross section, in particular. FIG. 15 is a plan view showing a first layer of a second portion of the coil in the magnetic head according to the present embodiment. FIG. 16 is a plan view showing a second layer of the second portion of the coil in the magnetic head according to the present embodiment.

The magnetic head according to the present embodiment has a second portion 120 instead of the second portion 20 of the coil of the first embodiment. The second portion 120 includes a first layer 121 and a second layer 122. The second layer 122 is disposed above the first layer 121.

The magnetic head according to the present embodiment further has insulating films 91, 93 and 94 and an insulating layer 92 each made of an insulating material, instead of the insulating films 63, 64, 66 and 68 of the first embodiment. The magnetic head according to the present embodiment is without the magnetic layers 43 and 44 and the insulating layer 67 of the first embodiment. The second return path section of the present embodiment is composed of the yoke layer 40 and the magnetic layers 41, 42 and 45.

As shown in FIG. 15, the first layer 121 is wound two turns around the yoke layer 40. The first layer 121 includes two second coil elements 121A and 121B passing between the second shield 16D and the yoke layer 40, in particular, within the second space S2. The second coil elements 121A and 121B are aligned in the direction perpendicular to the medium facing surface 30, in the listed order from the medium facing surface 30 side. In the present embodiment, the coil elements 121A and 121B are the first specific coil elements.

The insulating film 91 is interposed between the first layer 121 and each of the second shield 16D, the yoke layer 40 and the second gap layer 18. The insulating layer 92 is disposed between adjacent turns of the first layer 121. The insulating film 91 is made of alumina, for example. The insulating layer 92 is made of photoresist, for example. The top surfaces of the first layer 121, the second shield 16D, the yoke layer 40, the insulating film 91 and the insulating layer 92 are even with each other.

The first layer 121 has a coil connection part 121S electrically connected to the coil connection part 10E of the first portion 10, and a coil connection part 121E electrically connected to the second layer 122. The coil connection part 121S is electrically connected to the coil connection part 10E via a not-shown columnar connection layer that penetrates a plurality of layers interposed between the first layer 121 and the first portion 10.

As shown in FIG. 16, the second layer 122 is wound approximately one turn around the magnetic layer 42. The second layer 122 includes a second coil element 122A passing between the magnetic layers 41 and 42, in particular, within the second space S2. The coil element 122A is greater than each of the coil elements 121A and 121B in width in the direction perpendicular to the medium facing surface 30. Relative to the coil elements 121A and 121B which are the first specific coil elements, the coil element 122A is located forward along the direction T of travel of the recording medium. Thus, in the present embodiment, the coil element 122A is the second specific coil element.

The insulating film 93 is interposed between the second layer 122 and each of the insulating layer 92 and the magnetic layers 41 and 42. The insulating film 93 is made of alumina, for example. The top surfaces of the second layer 122, the magnetic layers 41 and 42, the insulating film 93 and the insulating layer 65 are even with each other. The second layer 122 has a coil connection part 122S penetrating the insulating film 93 and electrically connected to the coil connection part 121E of the first layer 121.

The insulating film 94 is disposed to cover the second layer 121. The insulating film 94 is made of alumina, for example. The magnetic layer 45 is disposed over the magnetic layers 41 and 42 and the insulating film 94, and connects the magnetic layers 41 and 42 to each other.

The remainder of configuration, function and effects of the present embodiment are similar to those of the first embodiment.

Seventh Embodiment

Figure 17:
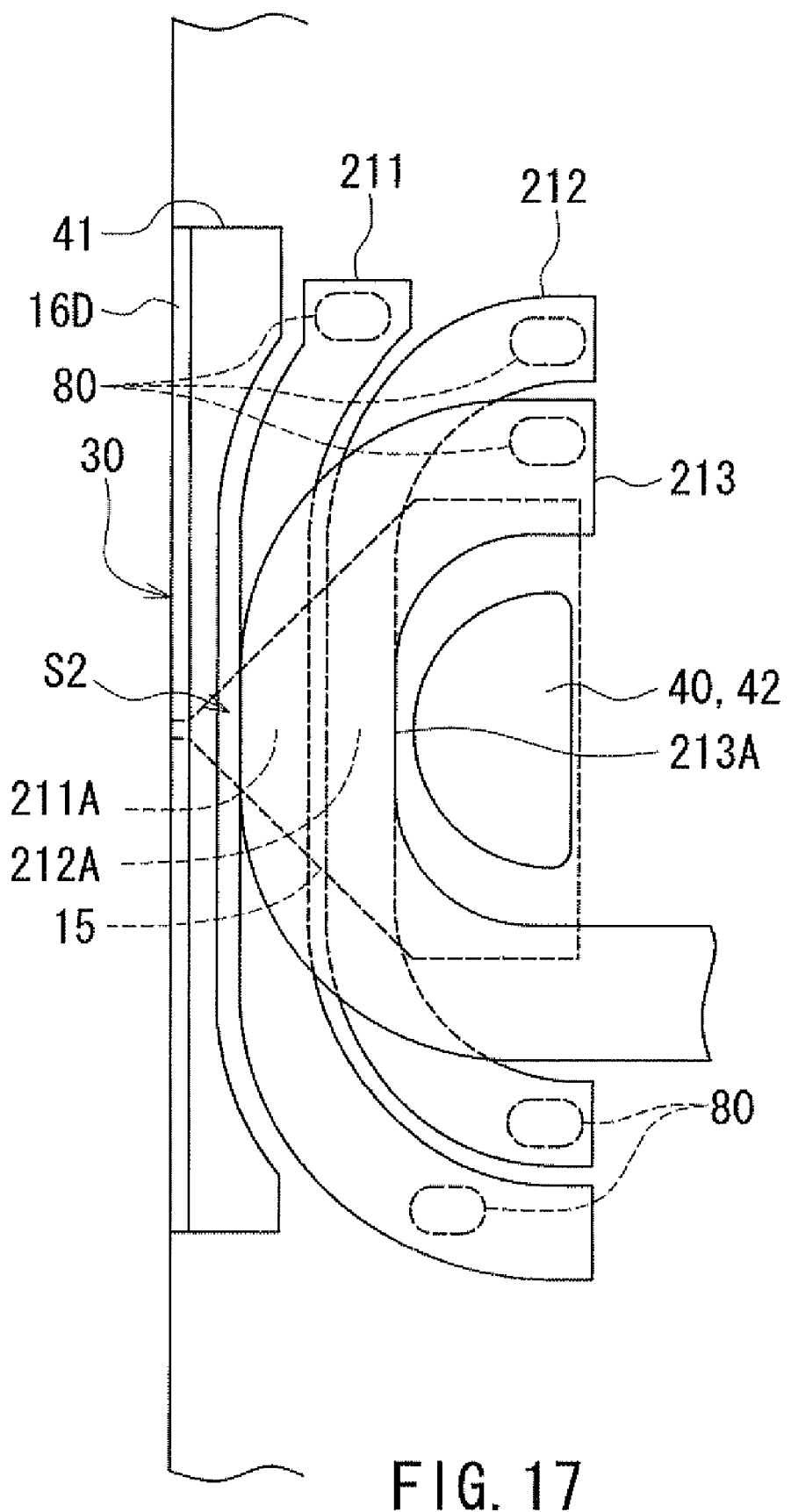
FIG. 17 is a plan view showing a plurality of second coil elements of a coil in a magnetic head according to a seventh embodiment of the invention.

A magnetic head according to a seventh embodiment of the invention will now be described with reference to FIG. 17. FIG. 17 is a plan view showing a plurality of second coil elements of the coil in the magnetic head according to the present embodiment.

The magnetic head according to the present embodiment is different from the magnetic head according to the sixth embodiment in the following respects. In the magnetic head according to the present embodiment, the coil is wound approximately three turns around the main pole 15. The coil of the present embodiment has the three line-shaped portions 11, 12 and 13 of the second embodiment shown in FIG. 9, instead of the first portion 10 of the sixth embodiment (the first embodiment) shown in FIG. 4. The coil of the present embodiment further has first to third layers 211, 212 and 213 shaped as shown in FIG. 17, instead of the first layer 121 and the second layer 122 of the sixth embodiment shown in FIG. 15 and FIG. 16.

The first layer 211 and the second layer 212 are located in the same plane. The first layer 211 and the second layer 212 respectively include second coil elements 211A and 212A passing between the second shield 16D and the yoke layer 40, in particular, within the second space S2. The second coil elements 211A and 212A are aligned in the direction perpendicular to the medium facing surface 30, in the listed order from the medium facing surface 30 side. In the present embodiment, the coil elements 211A and 212A are the first specific coil elements.

The third layer 213 is disposed above the first layer 211 and the second layer 212. The third layer 213 includes a second coil element 213A passing between the magnetic layers 41 and 42, in particular, within the second space S2. The coil element 213A is greater than each of the coil elements 211A and 212A in width in the direction perpendicular to the medium facing surface 30. Relative to the coil elements 211A and 212A which are the first specific coil elements, the coil element 213A is located forward along the direction T of travel of the recording medium. Thus, in the present embodiment, the coil element 213A is the second specific coil element.

The line-shaped portions 11, 12 and 13 are electrically connected to the first to third layers 211, 212 and 213 via five columnar connection layers 80 that penetrate a plurality of layers interposed between them so as to form a coil that is wound helically around the main pole 15.

The remainder of configuration, function and effects of the present embodiment are similar to those of the sixth embodiment.

Eighth Embodiment

A magnetic head according to an eighth embodiment of the invention will now be described with reference to FIG. 18.

Figure 18:
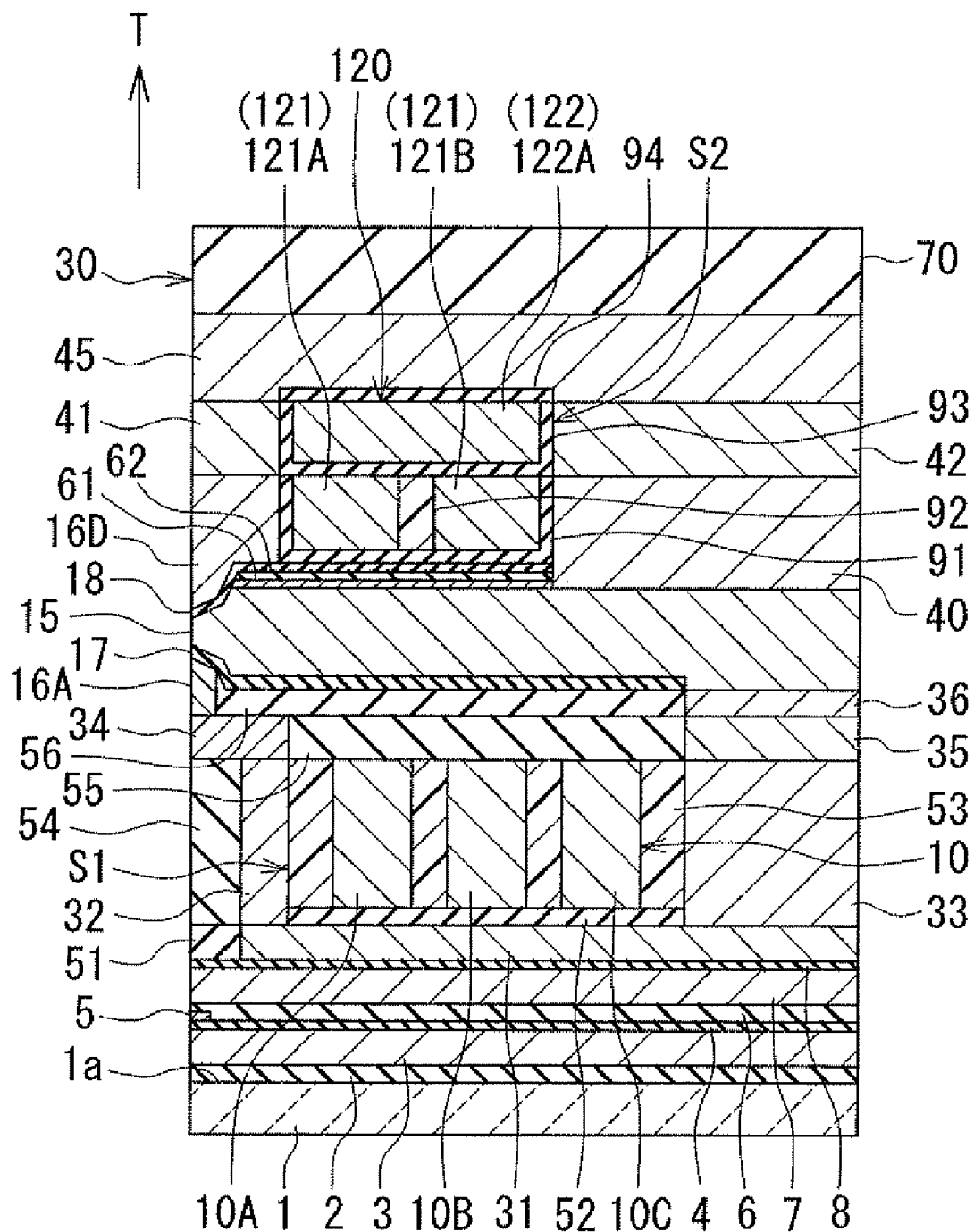
FIG. 18 is a cross-sectional view of a magnetic head according to an eighth embodiment of the invention.

FIG. 18 is a cross-sectional view of the magnetic head according to the present embodiment. FIG. 18 shows a cross section perpendicular to the medium facing surface and the top surface of the substrate, or the main cross section, in particular.

The magnetic head, according to the present embodiment is different from the magnetic head according to the sixth embodiment in the following respects. In the magnetic head according to the present embodiment, each of the magnetic layers 41 and 45 has an end face located in the medium facing surface 30. FIG. 18 shows an example where the coil includes the first portion 10 and the second portion 20 as in the sixth embodiment. However, the coil of the present embodiment may be configured to be wound helically around the main pole 15 as in the seventh embodiment.

The remainder of configuration, function and effects of the present embodiment are similar to those of the sixth or seventh embodiment.

Ninth Embodiment

Figure 19:
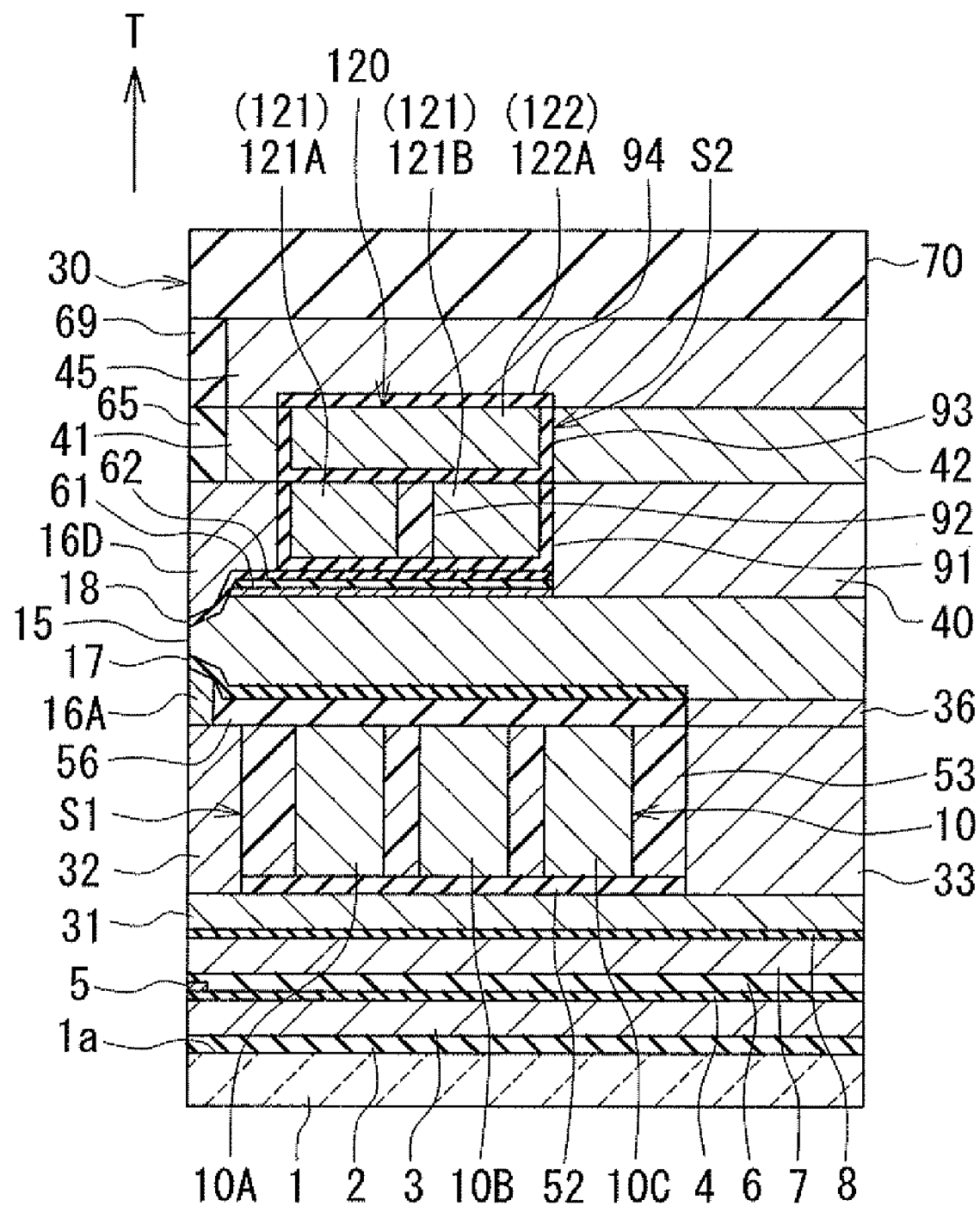
FIG. 19 is a cross-sectional view of a magnetic head according to a ninth embodiment of the invention.

A magnetic head according to a ninth embodiment of the invention will now be described with reference to FIG. 19. FIG. 19 is a cross-sectional view of the magnetic head according to the present embodiment. FIG. 19 shows a cross section perpendicular to the medium facing surface and the top surface of the substrate, or the main cross section, in particular.

The magnetic head according to the present embodiment is different from the magnetic head according to the sixth embodiment in the following respects. In the magnetic head according to the present embodiment, each of the magnetic layers 31 and 32 has an end face located in the medium facing surface 30, as in the fourth embodiment. The present embodiment is without the magnetic layers 34 and 35 and the insulating layer 55 of the sixth embodiment (the first embodiment). The first shield 16A is disposed on the magnetic layer 32. The magnetic layer 36 is disposed on the magnetic layer 33. The insulating layer 56 is disposed on the top surfaces of the first portion 10 of the coil and the insulating layer 53.

FIG. 19 shows an example where the coil includes the first portion 10 and the second portion 120 as in the sixth embodiment. However, the coil of the present embodiment may be configured to be wound helically around the main pole 15 as in the seventh embodiment.

The remainder of configuration, function and effects of the present embodiment are similar to those of the sixth or seventh embodiment.

Tenth Embodiment

Figure 20:
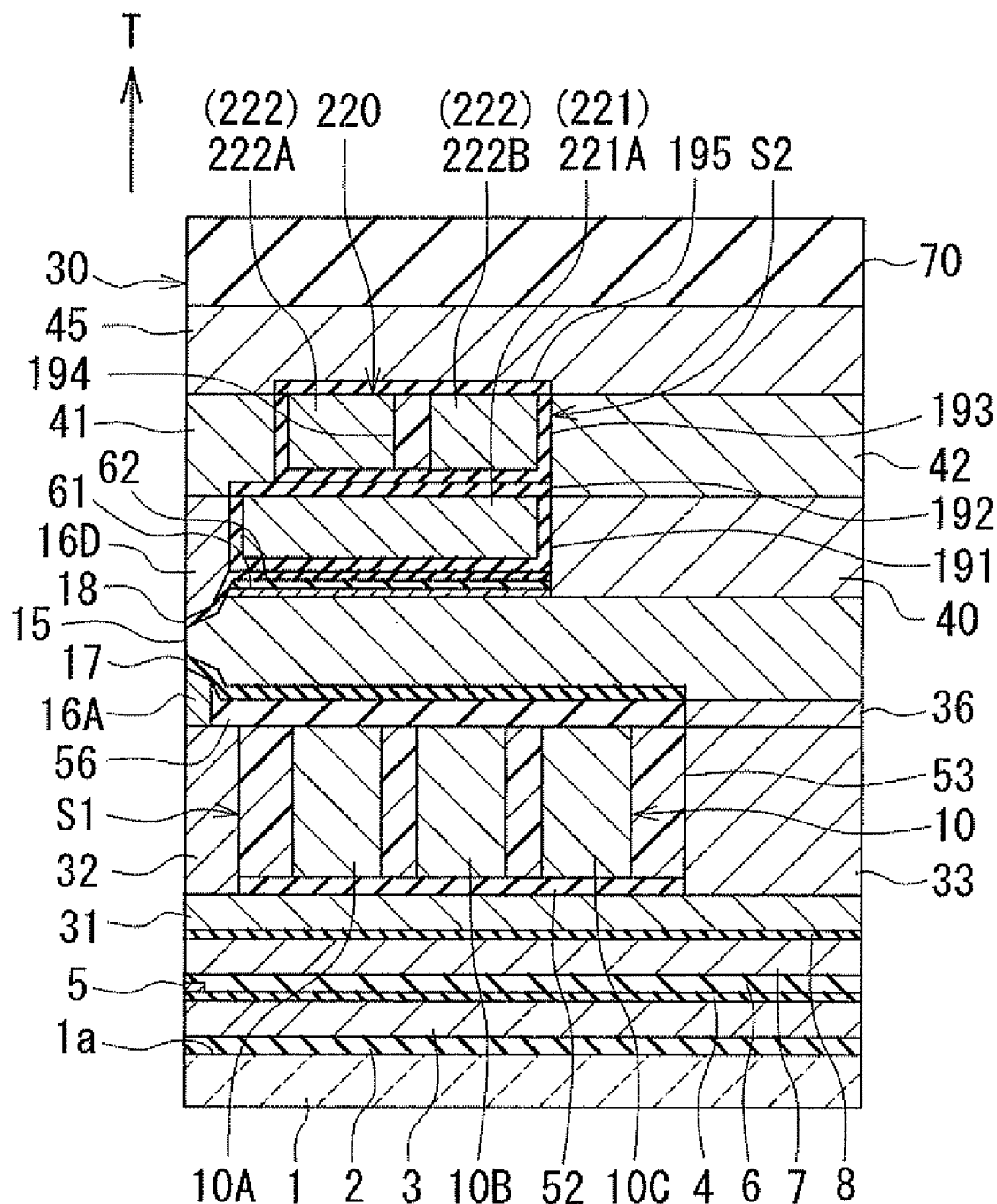
FIG. 20 is a cross-sectional view of a magnetic head according to a tenth embodiment of the invention.
Figure 21:
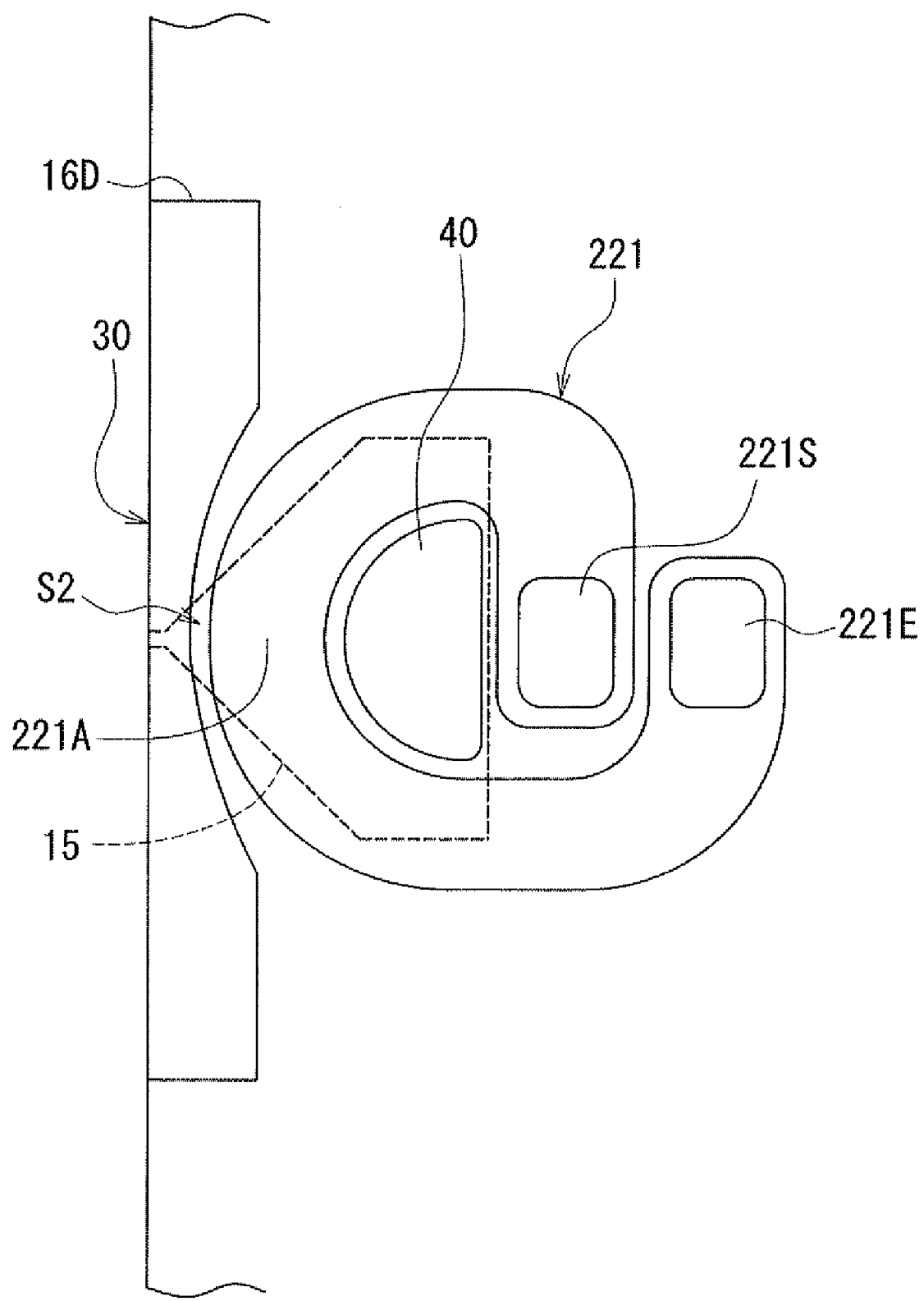
FIG. 21 is a plan view showing a first layer of a second portion of a coil in the magnetic head according to the tenth embodiment of the invention.
Figure 22:
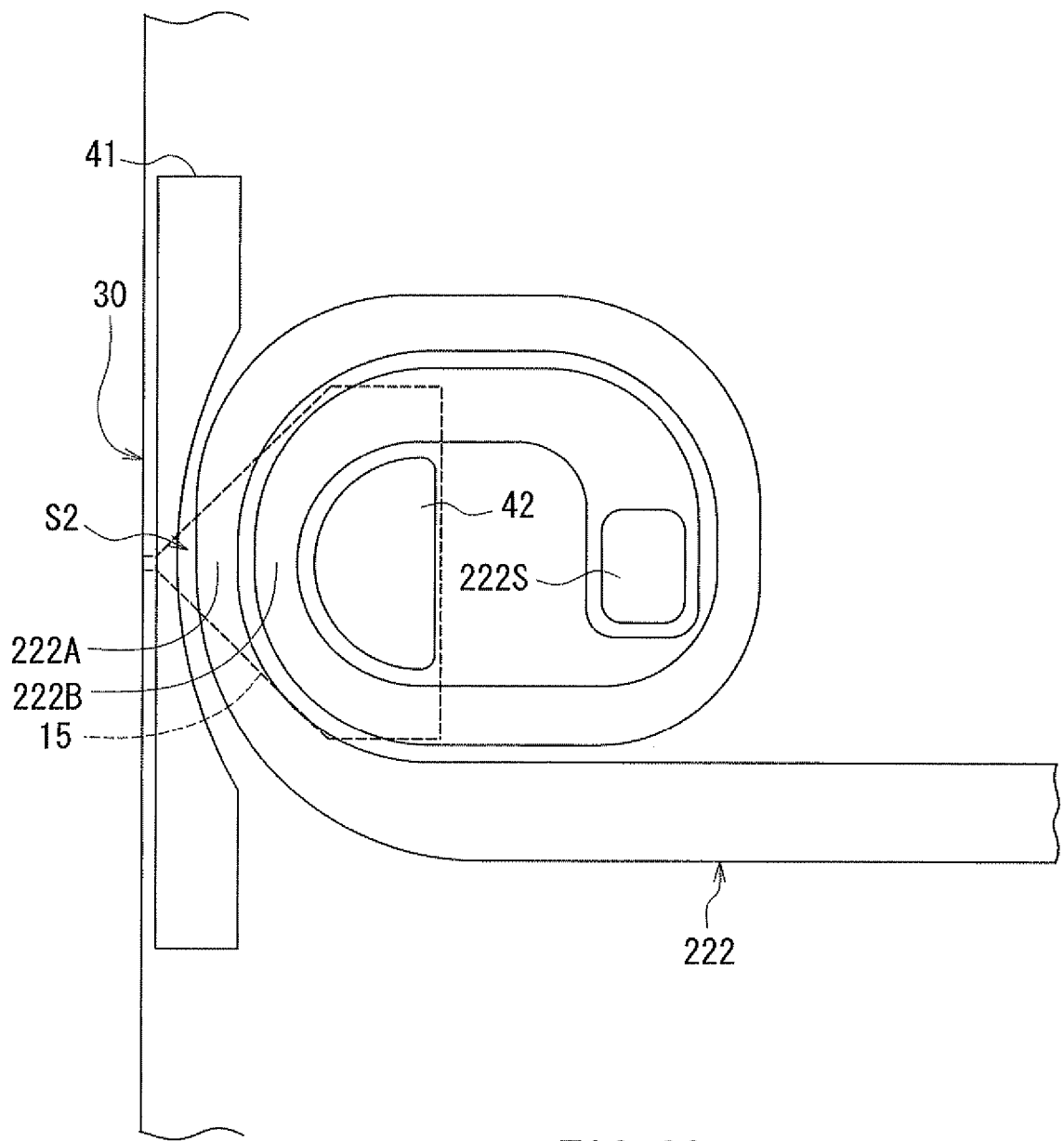
FIG. 22 is a plan view showing a second layer of the second portion of the coil in the magnetic head according to the tenth embodiment of the invention.

A magnetic head according to a tenth embodiment of the invention will now be described with reference to FIG. 20 to FIG. 22. FIG. 20 is a cross-sectional view of the magnetic head according to the present embodiment. FIG. 20 shows a cross section perpendicular to the medium facing surface and the top surface of the substrate, or the main cross section, in particular. FIG. 21 is a plan view showing a first layer of a second portion of the coil in the magnetic head according to the present embodiment. FIG. 22 is a plan view showing a second layer of the second portion of the coil in the magnetic head according to the present embodiment.

The magnetic head according to the present embodiment is different from the magnetic head according to the ninth embodiment in the following respects. The magnetic head according to the present embodiment has a second portion 220 instead of the second portion 120 of the coil of the ninth embodiment (the sixth embodiment). The second portion 220 includes a first layer 221 and a second layer 222. The second layer 222 is disposed above the first layer 221.

The magnetic head according to the present embodiment further has insulating films 191, 192, 193 and 195 and an insulating layer 194 each made of an insulating material, instead of the insulating films 91, 93 and 94 and the insulating layer 92 of the sixth embodiment. In addition, in the magnetic head according to the present embodiment, each of the magnetic layers 41 and 45 has an end face located in the medium facing surface 30.

As shown in FIG. 21, the first layer 221 is wound one turn around the yoke layer 40. The first layer 221 includes a second coil element 221A passing between the second shield 16D and the yoke layer 40, in particular, within the second space S2. In the present embodiment, the coil element 221A is the first specific coil element.

The insulating film 191 is interposed between the first layer 221 and each of the second shield 16D, the yoke layer 40 and the second gap layer 18. The insulating film 191 is made of alumina, for example. The top surfaces of the first layer 221, the second shield 16D, the yoke layer 40 and the insulating film 191 are even with each other. The insulating film 192 is disposed to cover the first layer 221.

The first layer 221 has a coil connection part 221S electrically connected to the coil connection part 10E of the first portion 10, and a coil connection part 221E electrically connected to the second layer 222. The coil connection part 221S is electrically connected to the coil connection part 10E via a not-shown columnar connection layer that penetrates a plurality of layers interposed between the first layer 221 and the first portion 10.

As shown in FIG. 22, the second layer 222 is wound approximately two turns around the magnetic layer 42. The second layer 222 includes two second coil elements 222A and 222B passing between the magnetic layers 41 and 42, in particular, within the second space S2. The second coil elements 222A and 222B are aligned in the direction perpendicular to the medium facing surface 30, in the listed order from the medium facing surface 30 side. The coil element 221A shown in FIG. 21 is greater than each of the coil elements 222A and 222B in width in the direction perpendicular to the medium facing surface 30. Relative to the coil element 221A which is the first specific coil element, the coil elements 222A and 222B are located forward along the direction T of travel of the recording medium. Thus, in the present embodiment, the coil elements 222A and 222B are the second specific coil elements.

The insulating film 193 is interposed between the second layer 222 and each of the insulating film 192 and the magnetic layers 41 and 42. The insulating layer 194 is disposed between adjacent turns of the second layer 222. The insulating film 193 is made of alumina, for example. The insulating layer 194 is made of photoresist, for example. The top surfaces of the second layer 222, the magnetic layers 41 and 42, the insulating film 193 and the insulating layer 194 are even with each other. The second layer 222 has a coil connection part 222S penetrating the insulating film 193 and electrically connected to the coil connection part 221E of the first layer 221.

The insulating film 195 is disposed to cover the second layer 222. The insulating film 195 is made of alumina, for example.

FIG. 20 shows an example where the coil includes the first portion 10 and the second portion 220 as in the ninth embodiment. However, the coil of the present embodiment may be configured to be wound helically around the main pole 15 as in the seventh embodiment.

The remainder of configuration, function and effects of the present embodiment are similar to those of the ninth embodiment.

The present invention is not limited to the foregoing embodiments, and various modifications may be made thereto. For example, as far as the requirements of the appended claims are met, the first and second coil elements and the first and second specific coil elements can be provided in any number, without being limited to the examples illustrated in the foregoing embodiments.

While the foregoing embodiments has been described with reference to a magnetic head having a structure where the read head is formed on the base body and the write head is stacked on the read head, the read head and the write head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A magnetic head for perpendicular magnetic recording, comprising:
   a medium facing surface that faces a recording medium;
   a coil that produces a magnetic field corresponding to data to be written on the recording medium;
   a main pole that has an end face located in the medium facing surface, allows a magnetic flux corresponding to the magnetic field produced by the coil to pass, and produces a write magnetic field for writing the data on the recording medium by means of a perpendicular magnetic recording system;
   a first shield made of a magnetic material and having an end face that is located in the medium facing surface at a position backward of the end face of the main pole along a direction of travel of the recording medium;
   a second shield made of a magnetic material and having an end face that is located in the medium facing surface at a position forward of the end face of the main pole along the direction of travel of the recording medium;
   a gap part made of a nonmagnetic material and provided between the main pole and each of the first and second shields;
   a first return path section that is made of a magnetic material, disposed backward of the main pole along the direction of travel of the recording medium, and in contact with the first shield and the main pole; and
   a second return path section that is made of a magnetic material, disposed forward of the main pole along the direction of travel of the recording medium, and in contact with the second shield and the main pole, wherein:
   the first return path section has an end face that is located away from the medium facing surface and in contact with the main pole, and the first return path section connects the first shield and the main pole to each other so that a first space is defined by the main pole, the gap part, the first shield, and the first return path section;
   the second return path section has an end face that is located away from the medium facing surface and in contact with the main pole, and the second return path section connects the second shield and the main pole to each other so that a second space is defined by the main pole, the gap part, the second shield, and the second return path section;
   a first interface is formed between the main pole and the end face of the first return path section;
   a second interface is formed between the main pole and the end face of the second return path section;
   the first interface has a first end that is closest to the medium facing surface, while the second interface has a second end that is closest to the medium facing surface, and the second end is located closer to the medium facing surface than is the first end;
   the second return path section includes: a yoke layer that is located away from the medium facing surface and includes the end face of the second return path section; and a connection part that is located forward of the second shield and the yoke layer along the direction of travel of the recording medium and connects the second shield and the yoke layer to each other;
   the coil includes one or more first coil elements that extend to pass through the first space, and one or more second coil elements that extend to pass through the second space; and
   the one or more second coil elements include at least one first specific coil element that passes between the second shield and the yoke layer.

2. The magnetic head for perpendicular magnetic recording according to claim 1, wherein:
   the one or more first coil elements are two or more first coil elements;
   the one or more second coil elements are two or more second coil elements;
   the two or more first coil elements are aligned in a direction perpendicular to the medium facing surface; and
   the at least one first specific coil element is smaller in number than the two or more first coil elements.

3. The magnetic head for perpendicular magnetic recording according to claim 2, wherein the two or more second coil elements include at least one second specific coil element that is located forward of the at least one first specific coil element along the direction of travel of the recording medium.

4. The magnetic head for perpendicular magnetic recording according to claim 1, wherein the coil includes a first portion and a second portion, the first portion including the one or more first coil elements and being wound around part of the first return path section, the second portion including the one or more second coil elements and being wound around part of the second return path section.

5. The magnetic head for perpendicular magnetic recording according to claim 1, wherein the coil is wound around the main pole.

6. The magnetic head for perpendicular magnetic recording according to claim 1, further comprising two side shields that are each made of a magnetic material and that have two end faces located in the medium facing surface at positions on opposite sides of the end face of the main pole in a track width direction.

* * * * *